United States Patent Office

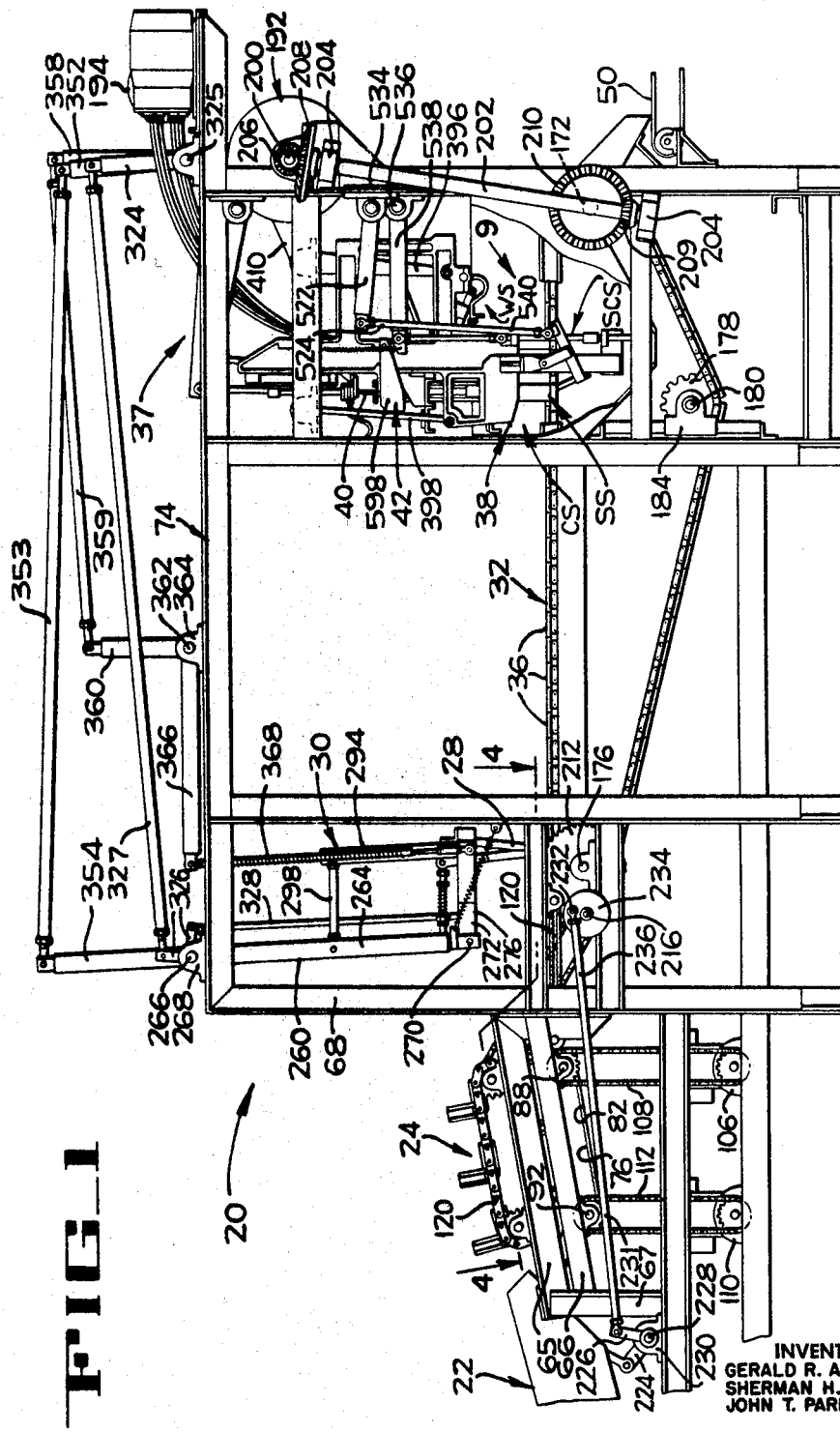

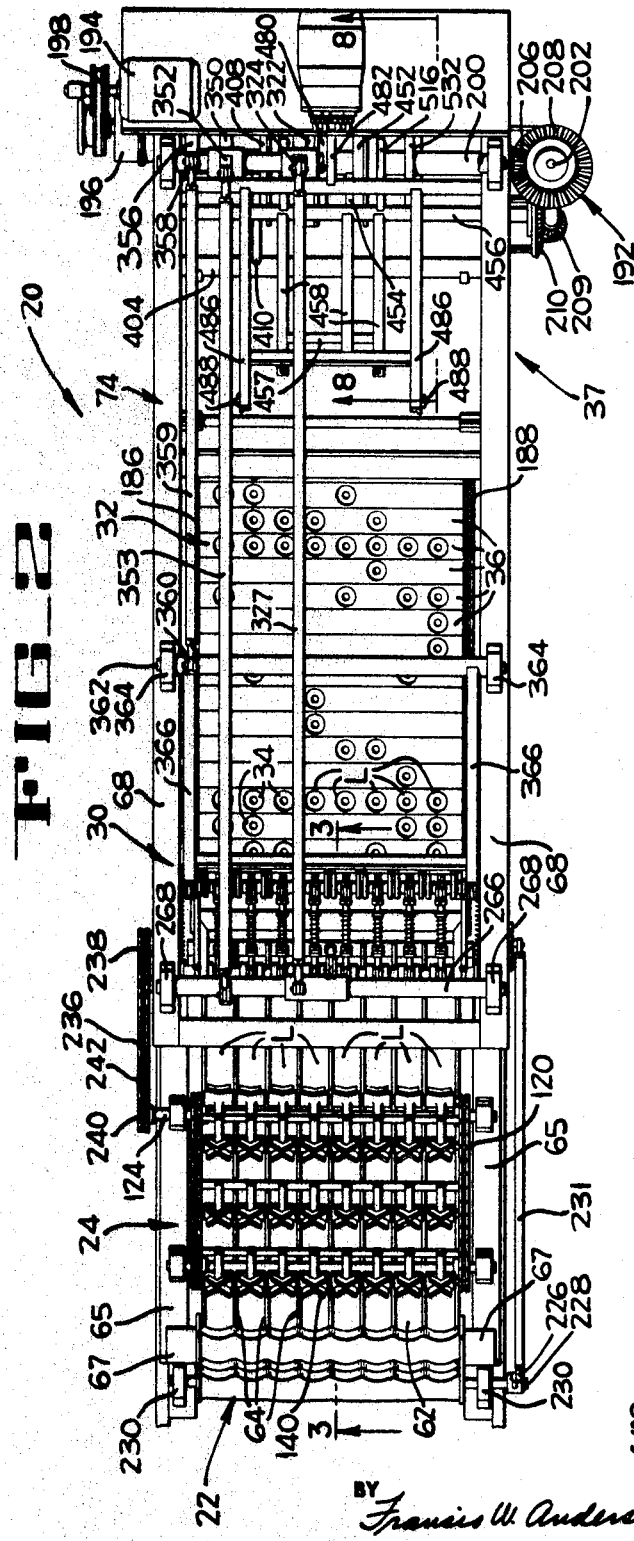

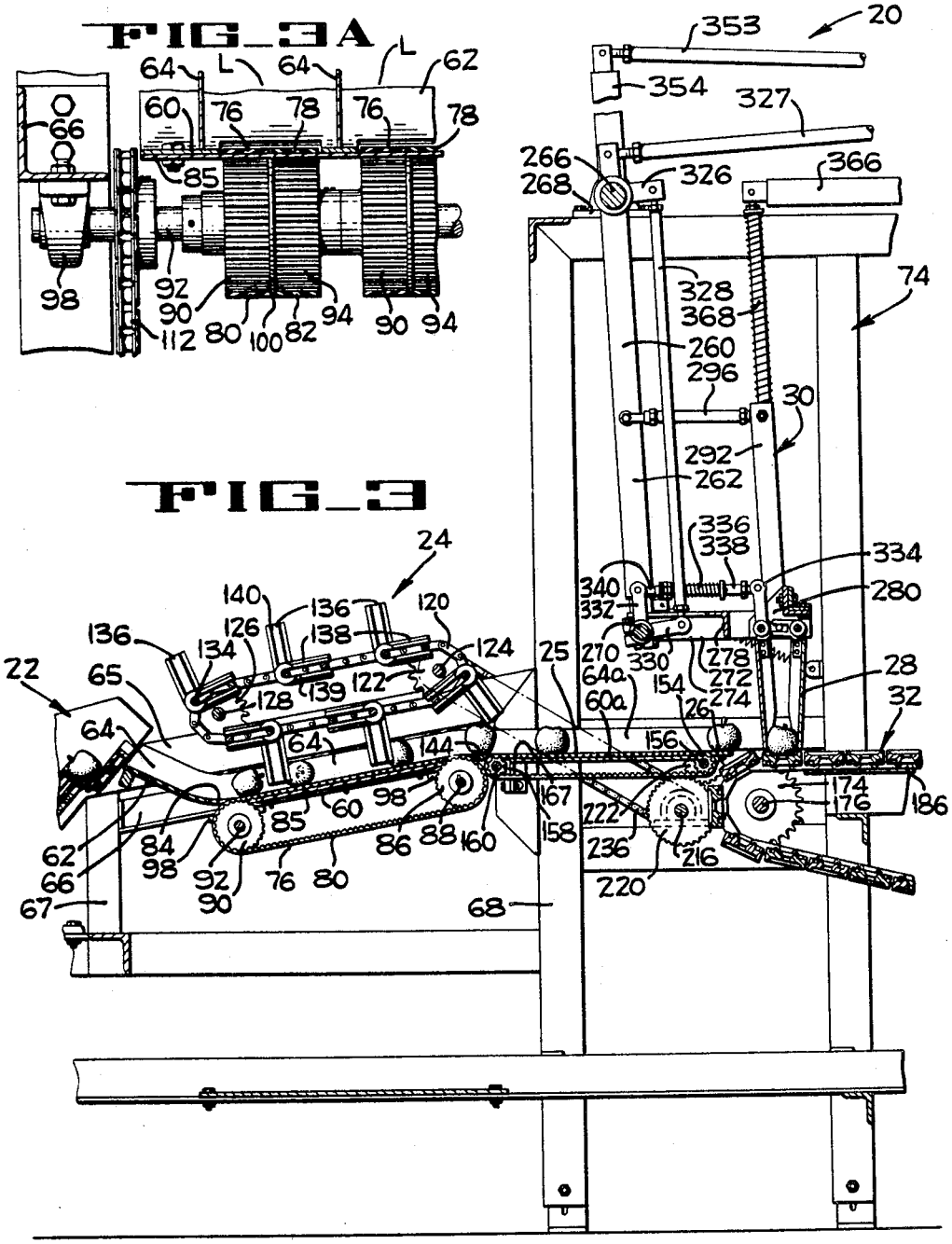

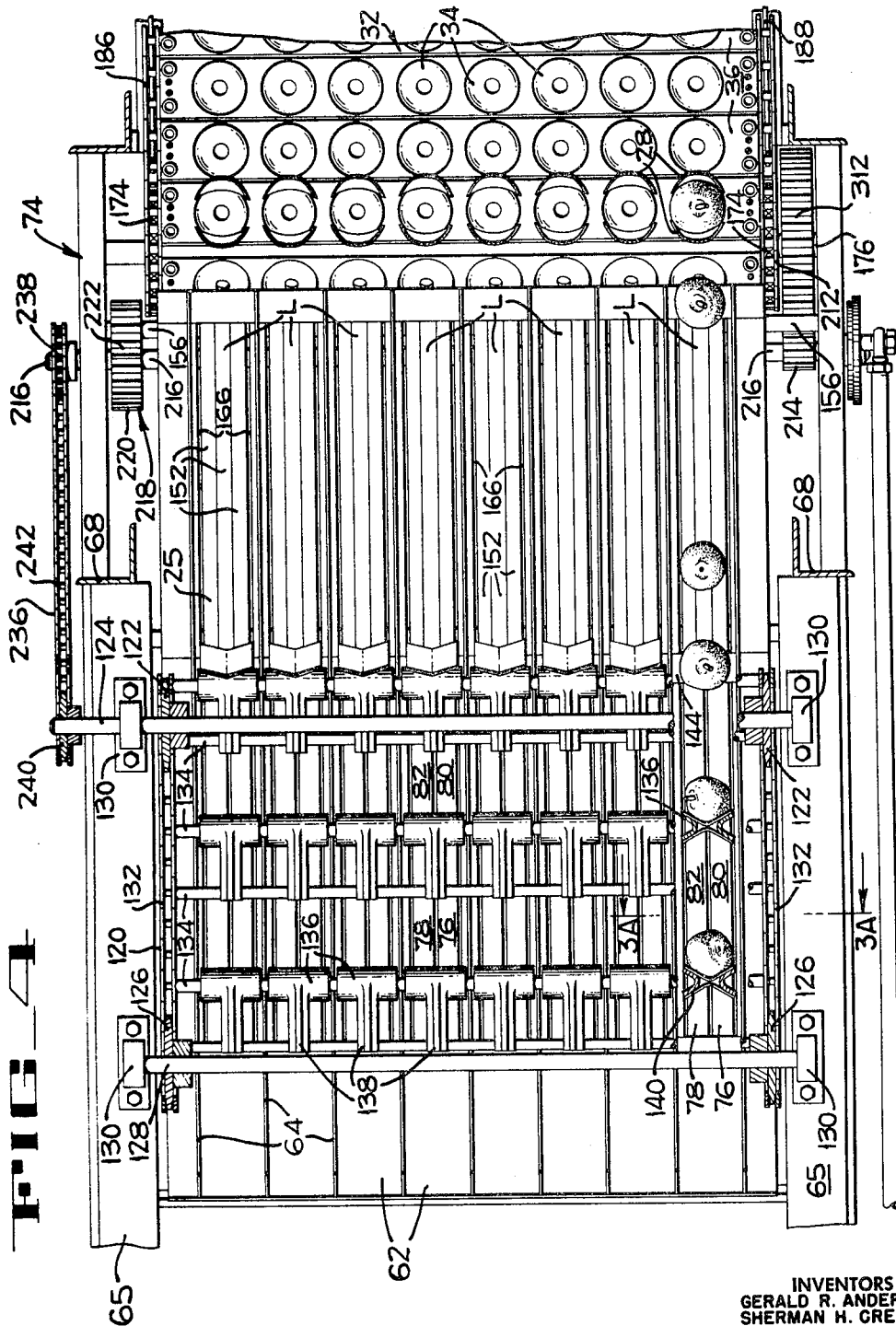

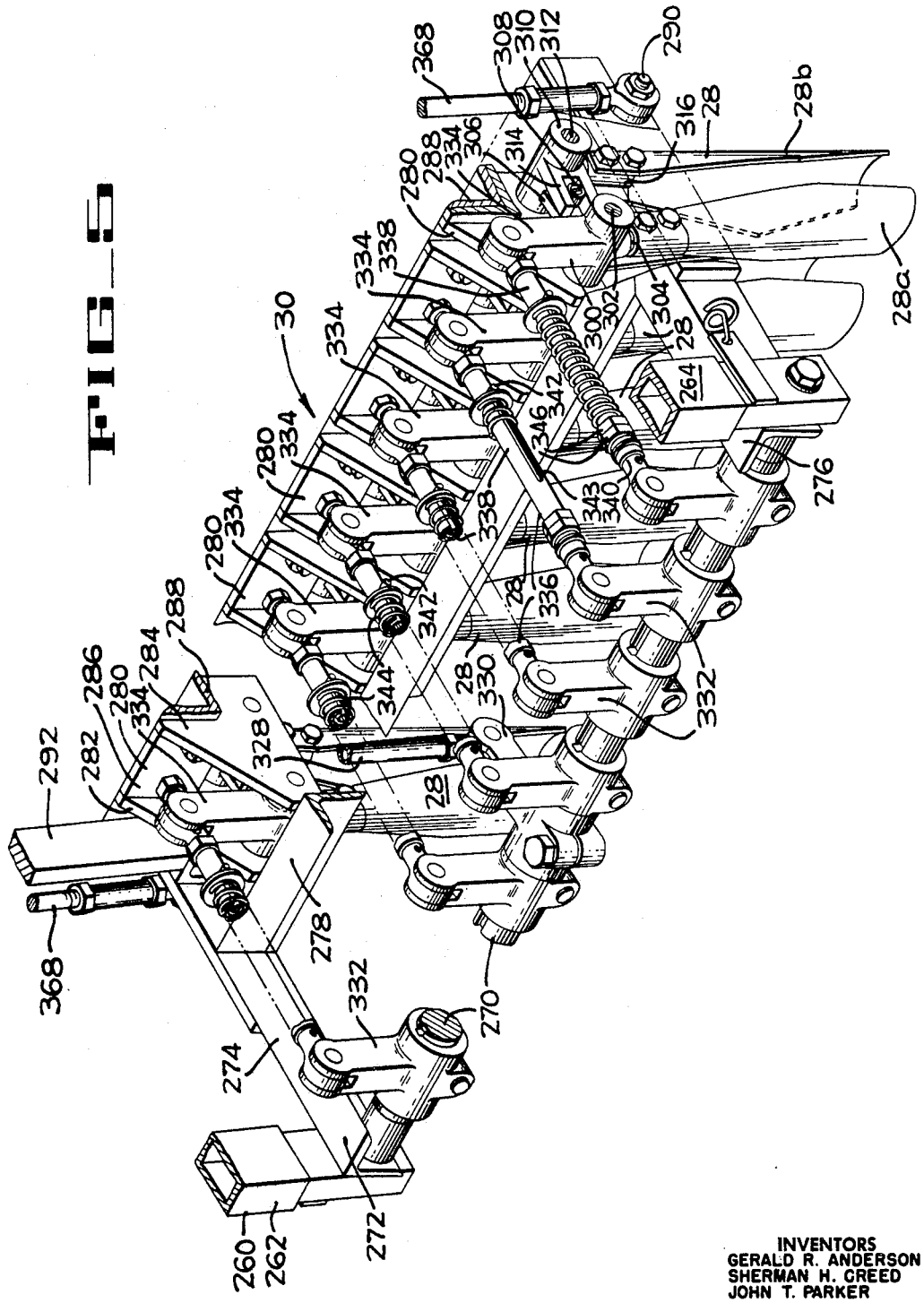

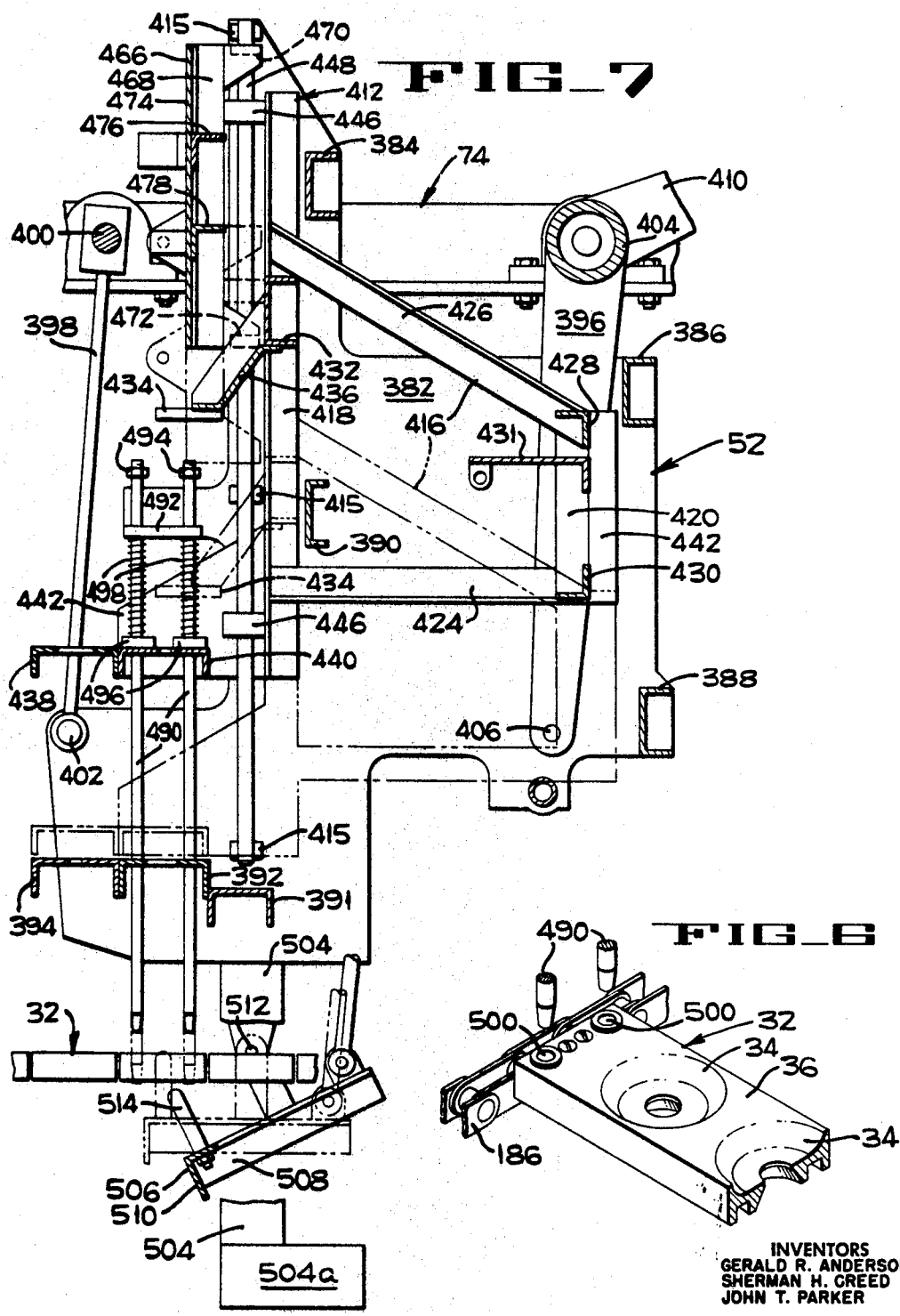

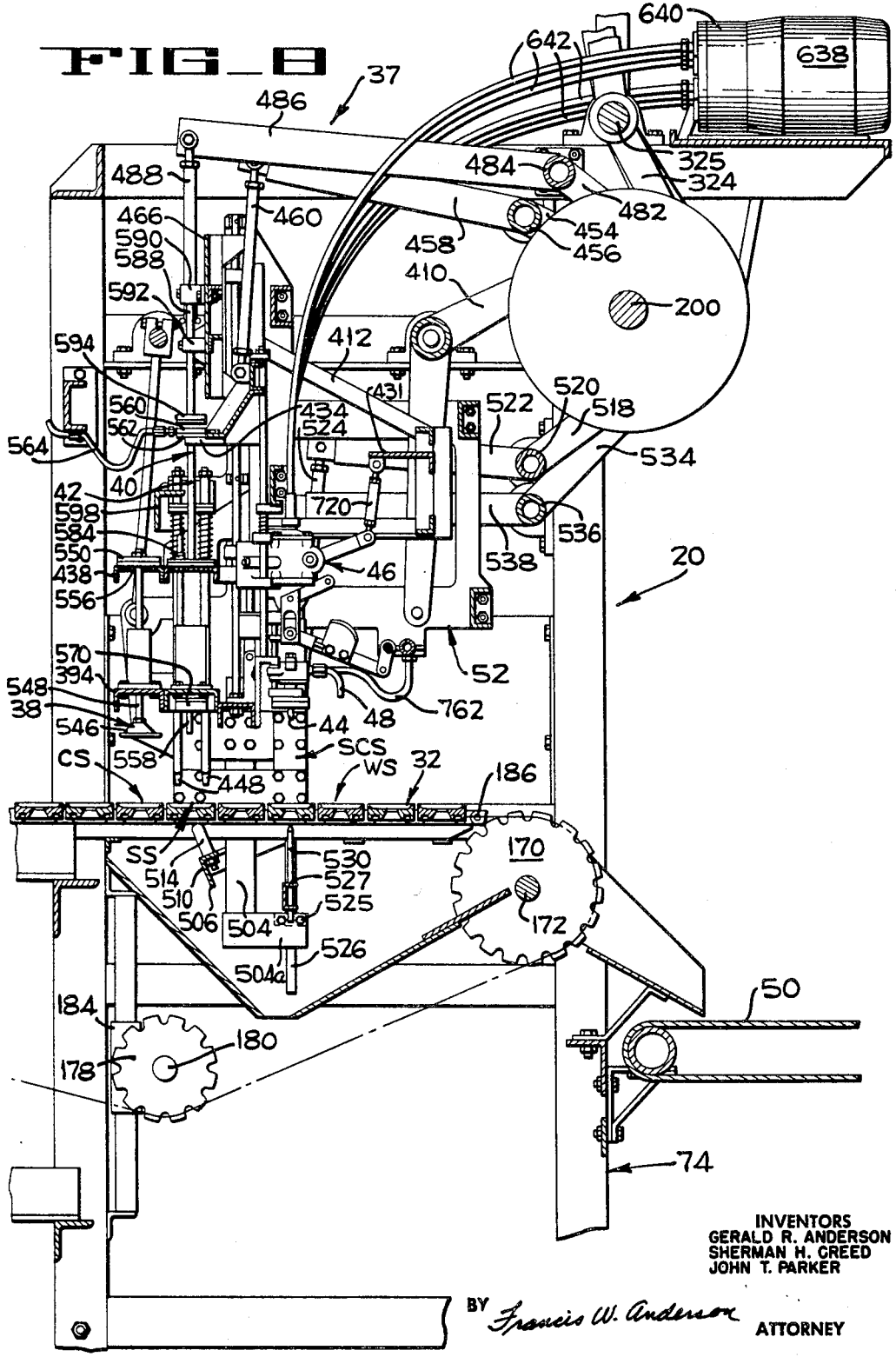

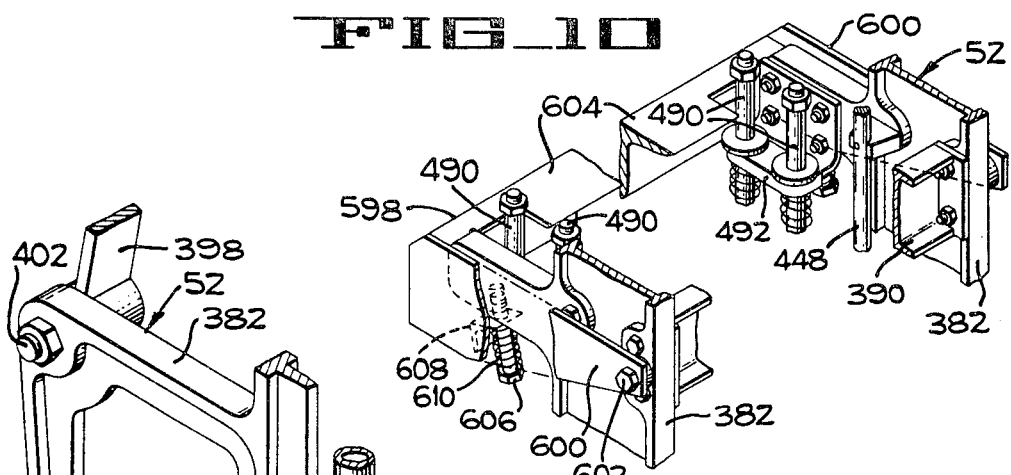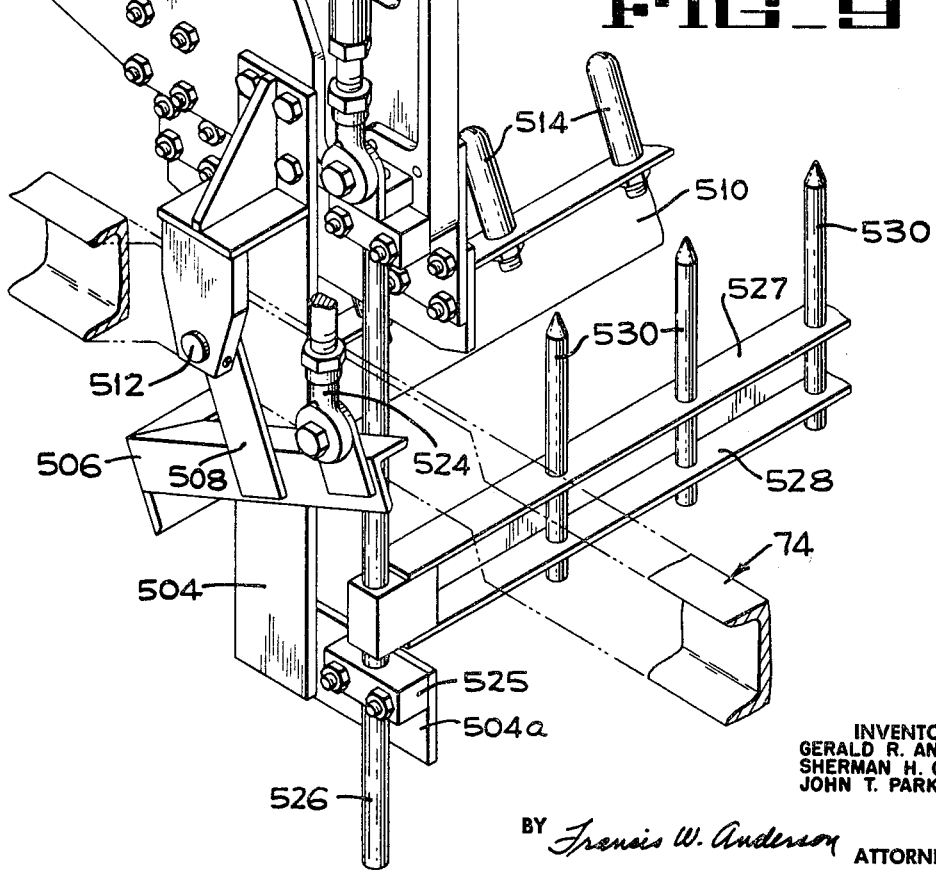

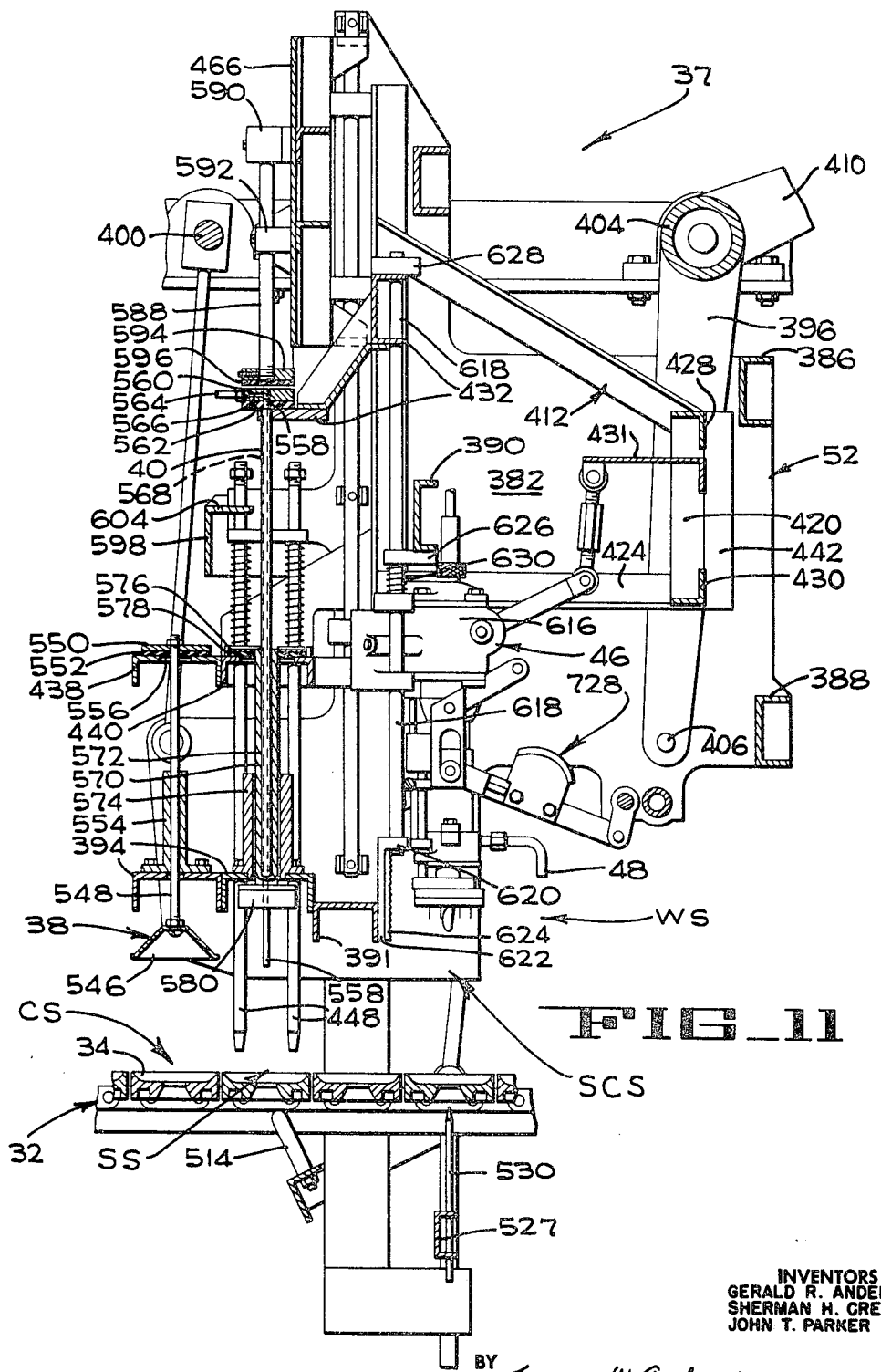

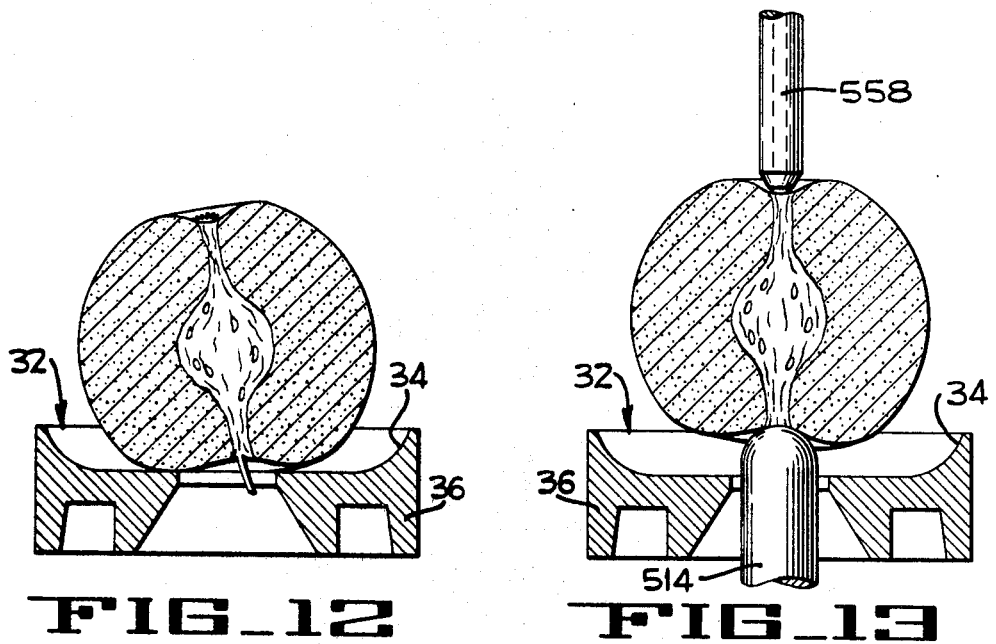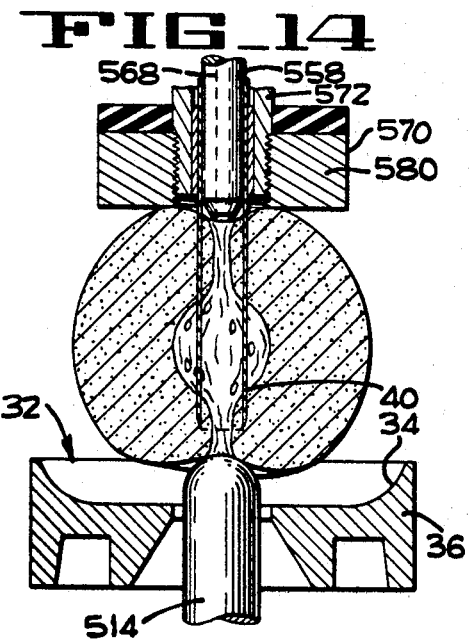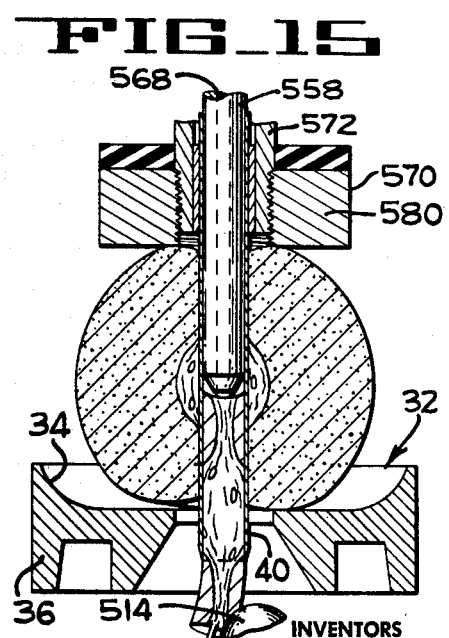

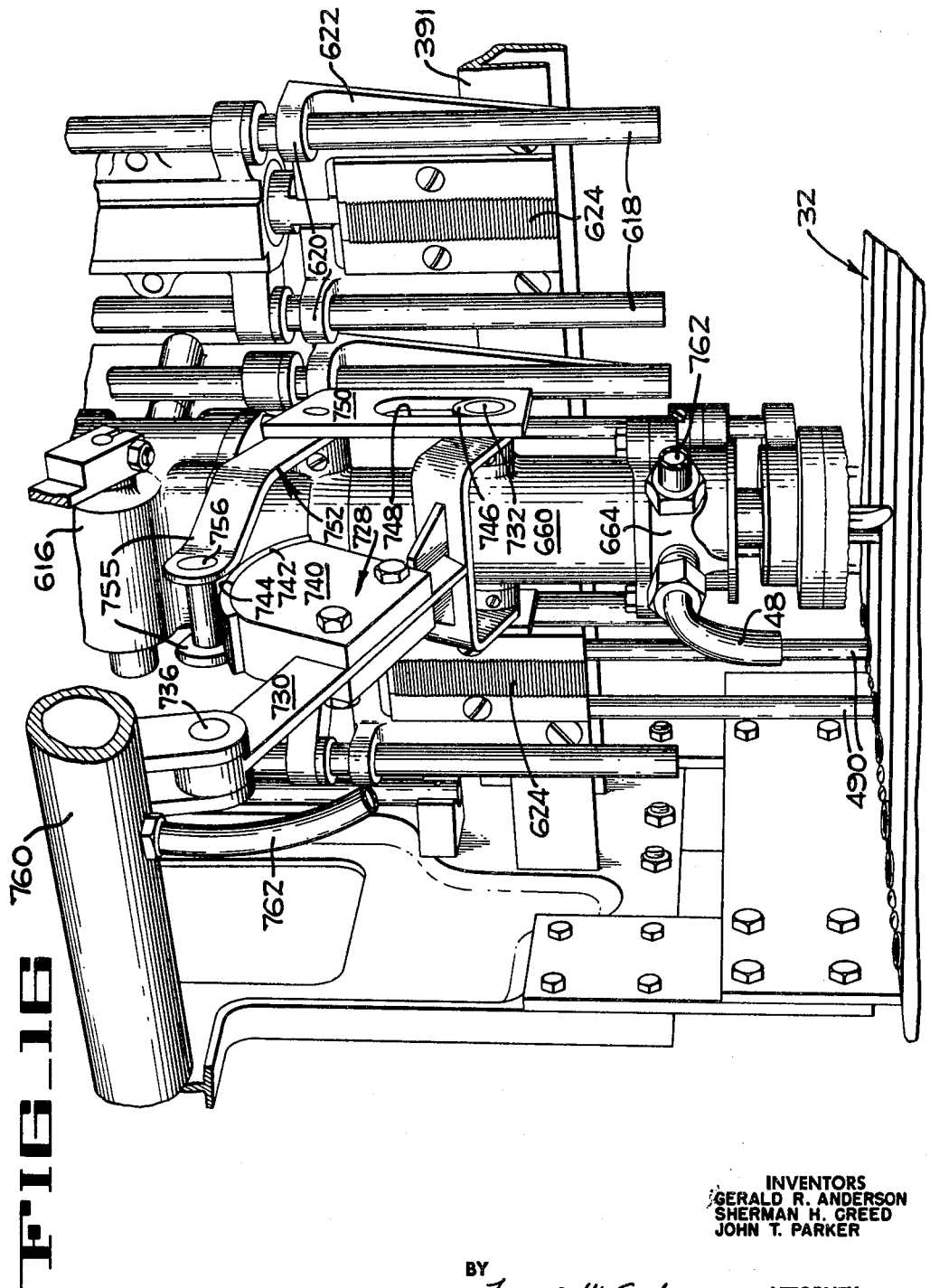

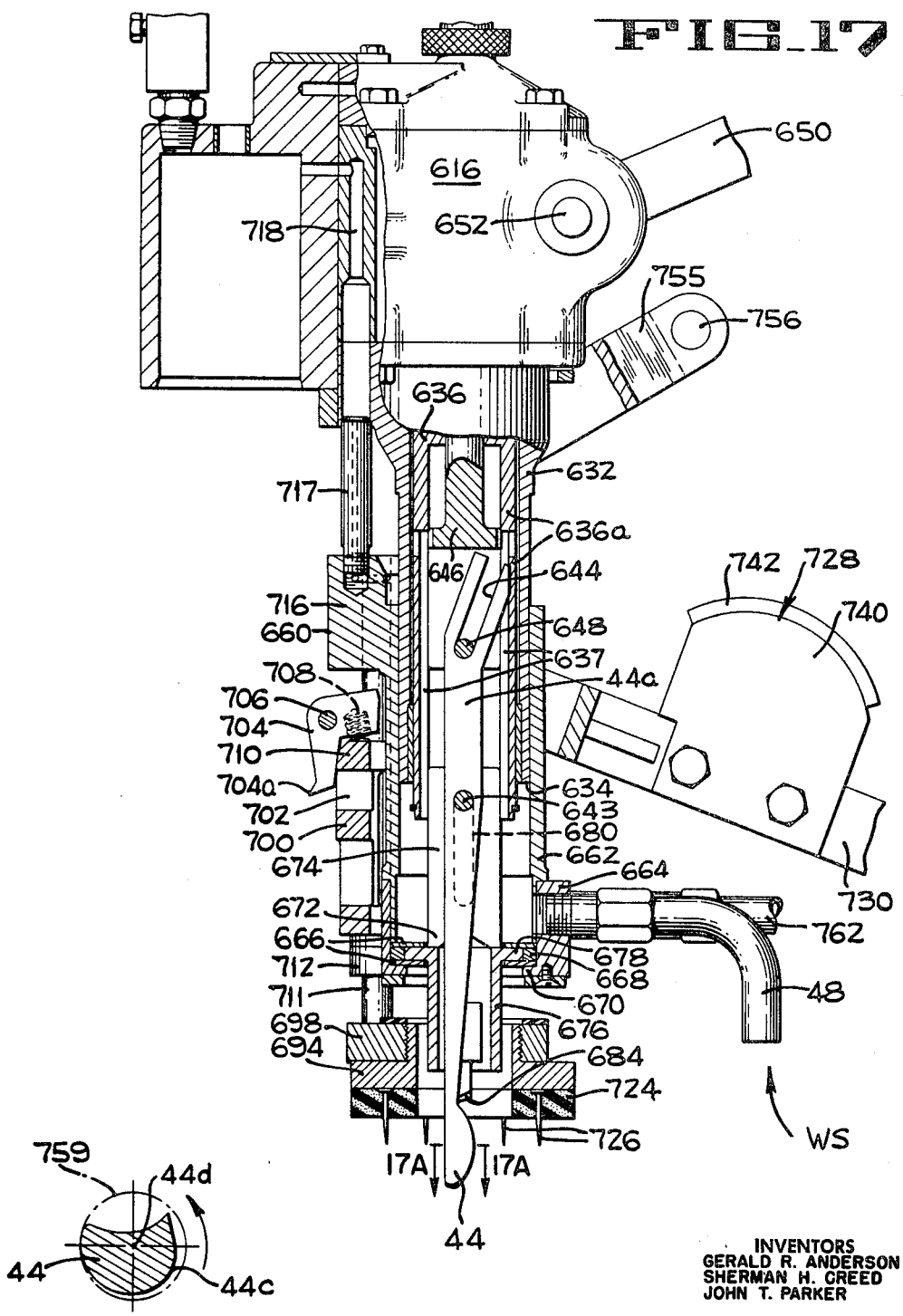

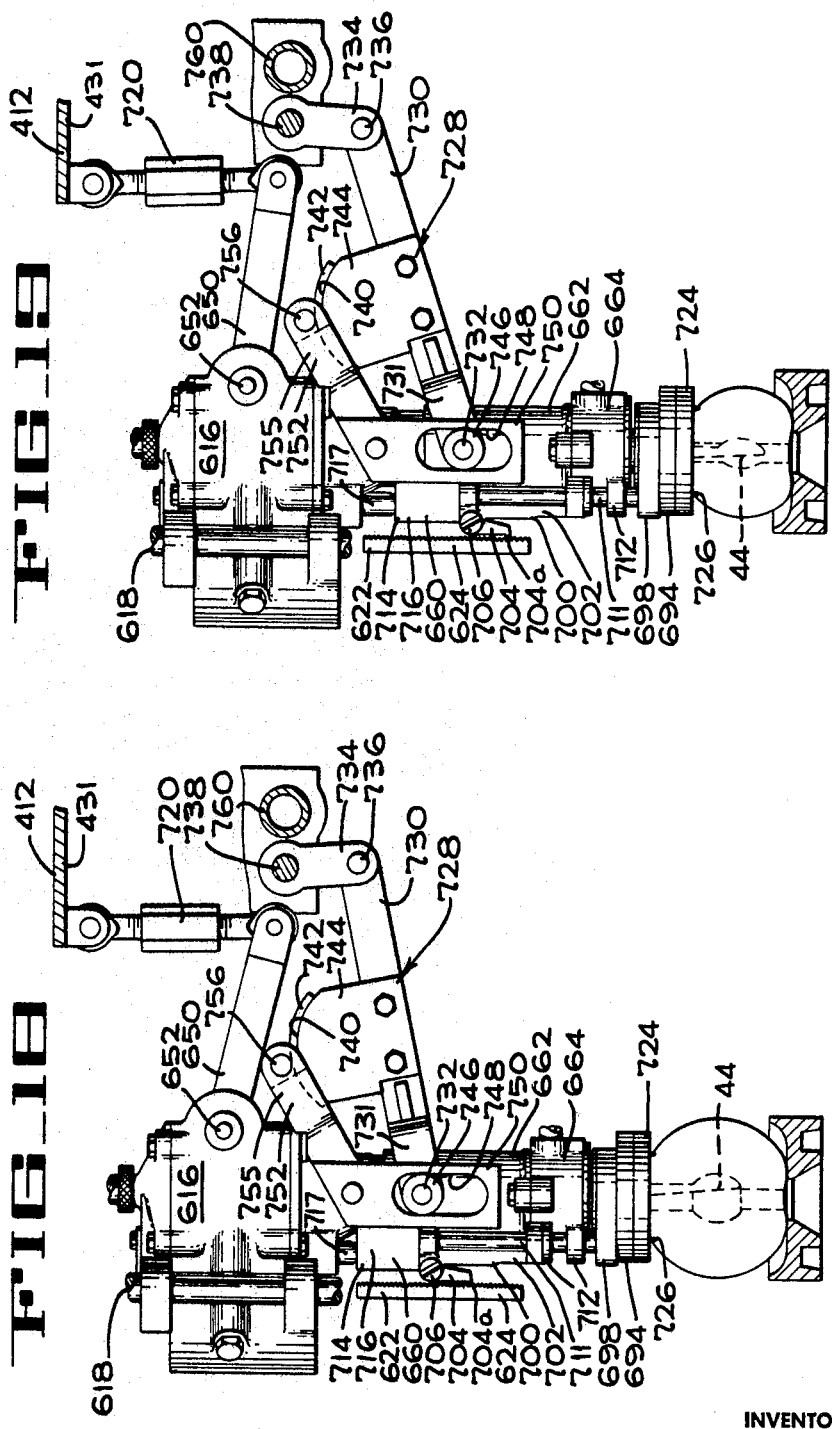

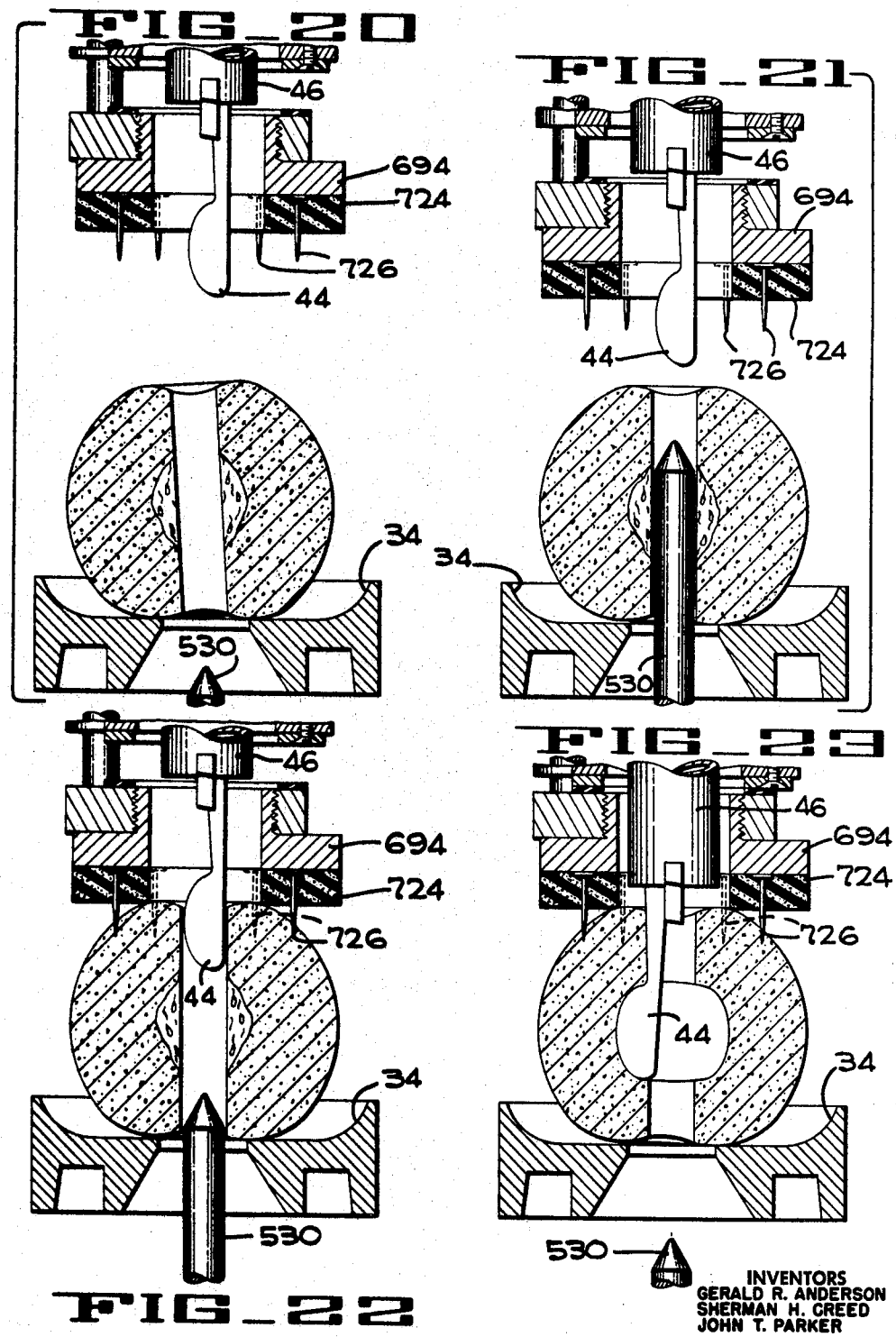

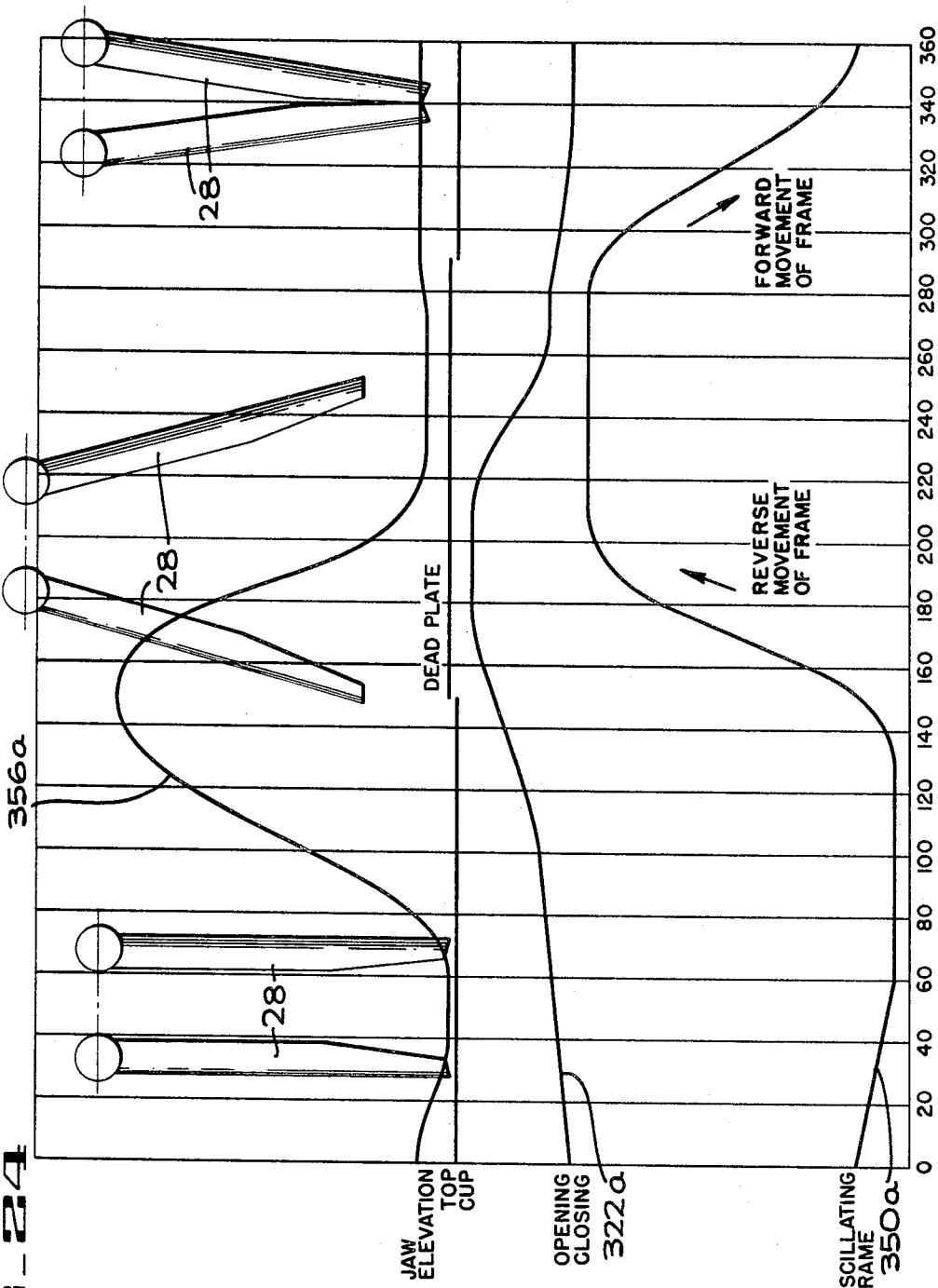

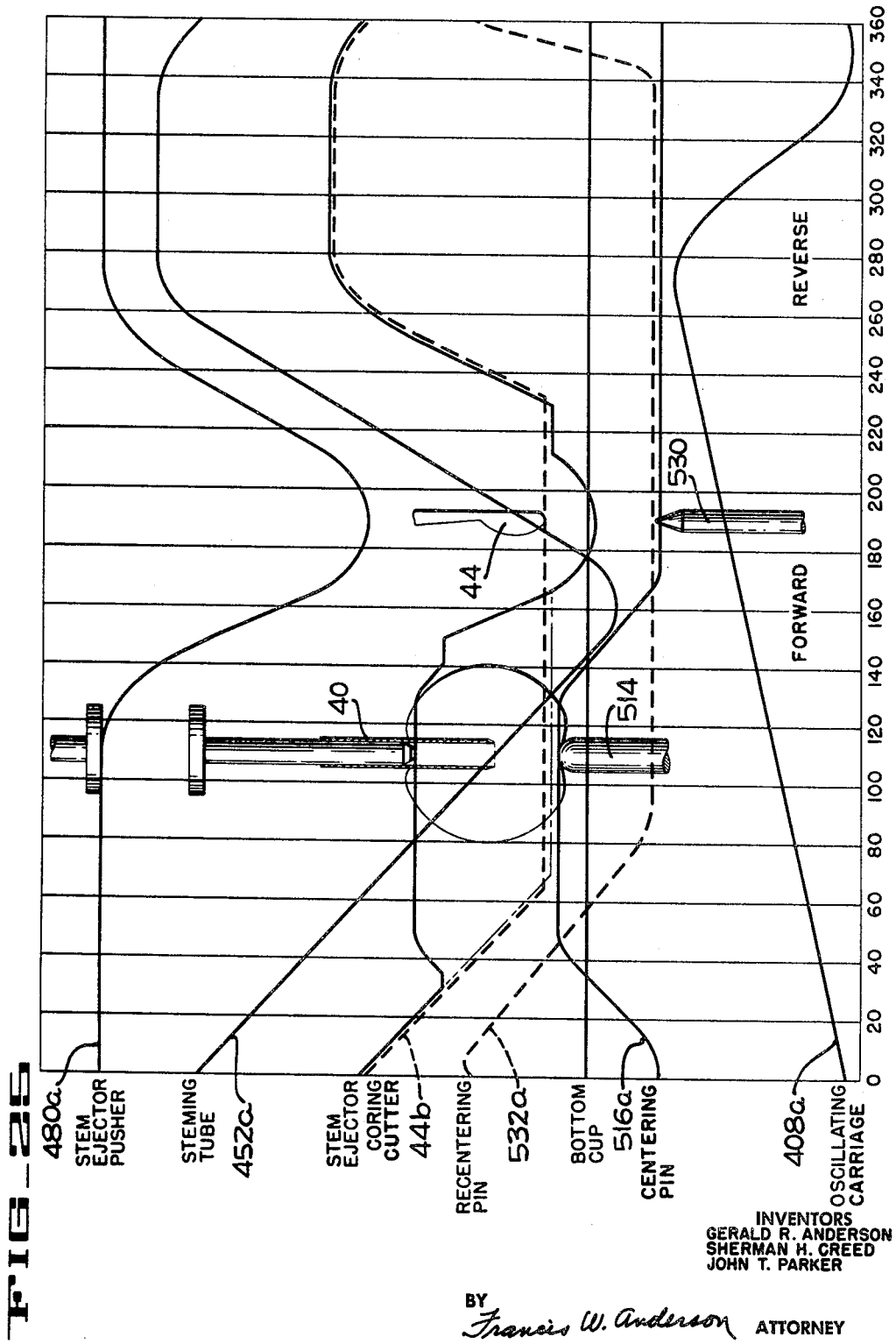

3,389,730
Patented June 25, 1968

---

3,389,730
APPLE ORIENTING AND CORING MACHINE
Gerald R. Anderson, Campbell, and Sherman H. Creed and John T. Parker, San Jose, Calif., assignors to FMC Corporation, San Jose, Calif., a corporation of Delaware
Original application Mar. 2, 1964, Ser. No. 348,485, now Patent No. 3,310,084, dated Mar. 21, 1967. Divided and this application Nov. 16, 1966, Ser. No. 606,487
7 Claims. (Cl. 146—52)

This application is a division of application Ser. No. 348,485, filed Mar. 2, 1964, now Patent No. 3,310,084.

The present invention pertains to apparatus for processing fruit and more particularly relates to an apparatus for orienting apples or the like, and for removing the stem material and the seed cell from each apple in accordance with the size of the apple.

The apparatus of the present invention is arranged to adapt fruit-preparation machines of the type disclosed in copending application of Gerald R. Anderson et al. Ser. No. 221,174 filed on Sept. 4, 1962; and copending application of Gerald R. Anderson, Ser. No. 206,955, filed July 2, 1962, now Patent Nos. 3,199,558 and 3,246,676, respectively to handle apples rather than pears. Since many of the features of the present apparatus are similar to those disclosed in the above mentioned applications, only those features which are different and which constitute the subject invention will be described in detail.

In order to automatically remove the stem material and the seed cells from apples without removing an excessive amount of edible material from the apples, and without leaving portions of the seed cells within the apples, the apples must first be oriented so that they are supported either on their relatively flat stem ends or blossom ends, with their axes disposed in a substantially vertical plane. Since apples are not always symmetrical and the stem-blossom axis of each apple is not always perpendicular to the apple supporting plane, in addition to the initial orienting operation, the stem-blossom axis of each apple must be accurately aligned immediately before the apple is engaged by a stemming tube and must again be aligned immediately before the apple is engaged by a seed cell, or coring cutter.

It is therefore one object of the present invention to provide apparatus for orienting apples so that the apples are supported either on their stem ends or on their blossom ends.

Another object is to provide an apparatus for orienting apples or the like either on their stem or blossom ends and thereafter removing the stem material and seed cell from the fruit.

Another object is to provide an apple orienting apparatus arranged to orient apples either on their stem ends or on their blossom ends, and to move each apple to a predetermined feed position.

Another object is to provide apparatus for reliably transferring oriented apples from a feed position into a carrier pocket of a processing conveyor while maintaining the orientation of the apples.

Another object is to provide means for centering an apple in a carrier pocket while maintaining its stem-blossom axis substantially vertical.

Another object is to provide apparatus for seeking the cavities on each end of an apple so as to move the stem-blossom axis of the apple into exact alignment with the axis of a cutting tool regardless of whether or not the stem-blossom axis of the apple is parallel to the cutting tool when the apple is supported on one of its ends in a carrier pocket that is aligned with the cutting tool.

Another object is to provide apparatus for controlling the vertical position of the seed cell removing cutter, and the diameter of cut which the seed cell cutter makes in the apple, in accordance with the height of the apple being processed.

Another object is to provide improved apparatus for holding the apple from rotation during the seed cell removing or coring operation.

Another object is to provide a seed cell removing cutter shaped to serve as a re-centering tool as well as a seed cell removing tool.

Another object is to provide a device for washing the seed cell material from the seed cell of the apple after the seed cell has been severed from the whole apple.

Another object is to provide means for positively discharging the stem material from the stemming tube.

These and other objects and advantages of the present invention will become apparent from the following description and the accompanying drawings, in which:

FIGURE 1 is a side elevation of the apple processing machine of the present invention.

FIGURE 2 is a schematic plan of the machine of FIGURE 1.

FIGURE 3 is an enlarged vertical section taken along lines 3—3 of FIGURE 2 showing the apple orienting and transfer mechanism.

FIGURE 3A is an enlarged section taken along lines 3A—3A of FIGURE 4 showing a portion of the orienting mechanism.

FIGURE 4 is an enlarged, generally horizontal section of the orienting mechanism taken along lines 4—4 of FIGURE 1, certain parts being cut away.

FIGURE 5 is an enlarged perspective of a portion of the transfer mechanism, certain parts being broken away.

FIGURE 6 is an enlarged perspective of a portion of a main processing conveyor showing an apple receiving pocket.

FIGURE 7 is a schematic vertical central section of an oscillating carriage and vertically reciprocable carriers supported by the carriage of the stemming and coring unit, the operating components of the unit being removed, and the carriers being shown in two operative positions.

FIGURE 8 is an enlarged vertical central section taken along lines 8—8 of FIGURE 2 showing operating components of the stemming and coring unit mounted on the carriage and carriers of FIGURE 7.

FIGURE 9 is an enlarged perspective looking in the direction of arrow 9 in FIGURE 1 showing a fragment of the carriage and the structure for mounting the centering pins and recentering pins.

FIGURE 10 is an enlarged fragmentary perspective looking in the same direction as FIGURE 9 and showing certain structure for controlling the actuation of the stem ejector rods, certain parts being broken away.

FIGURE 11 is an enlarged vertical section of the stemming and coring unit similar to FIGURE 8 but showing certain of the operating components in section.

FIGURES 12 through 15 are operational views showing progressive steps in the stemming operation.

FIGURE 16 is a perspective of a fragment of the stemming and coring unit looking towards the rear of the machine, certain parts being removed.

FIGURE 17 is an enlarged vertical contral section through one of the coring units.

FIGURE 17A is an enlarged horizontal section taken along lines 17A—17A of FIGURE 17.

FIGURES 18 and 19 are operational views showing the coring units coring a large apple and a small apple, respectively.

FIGURES 20 through 23 are operational views showing progressive steps in the recentering and core removing operations.

FIGURE 24 is a timing diagram for the transfer mechanism.

FIGURE 25 is a timing diagram for the stemming and coring unit.

In order to better understand the features of the apple processing machine of the present invention, a general description of the machine will be given before the parts pertinent to the present invention will be described in detail.

The apple processing machine 20 (FIGS. 1, 2 and 3) is a multi-lane machine adapted to simultaneously process a plurality of rows of apples, the machine shown in the drawings having eight lanes L. Apples are dumped in bulk into a multi-lane shuffle feed singulator 22 of the type disclosed in the copending application of D. W. Chamberlin, Ser. No. 174,118, which was filed on Feb. 19, 1962, and is assigned to the assignee of the present invention. The singulator 22 discharges transverse rows of apples into an orienting mechanism 24, a single apple of each transverse row being received in each longitudinally extending lane L. The orienting mechanism 24 shifts each apple to a stable position wherein it is supported either on its relatively flat stem end or on its relatively flat blossom end. The orienting mechanism 24 includes a spacing conveyor 25 that moves each transverse row of apples onto a dead plate 26 (FIG. 3) where each apple remains until gripped by one pair of a plurality of 25 pairs of jaws 28 of a transfer mechanism 30, one set of jaws being provided for each lane L.

The transfer mechanism 30 is operated in timed relation with the movement of the orienting mechanism 24, the singulator 22, and a continuously driven apple processing conveyor 32. The jaws of the transfer mechanism 30 moves in a generally elliptical path and transfers the associated apples from the dead plate 26 into associated ones of a plurality of apple supporting cups or pockets 34 formed in flights 36 of the conveyor 32. As illustrated in FIGURE 2, each flight 36 extends transversely of the conveyor and includes a plurality of the flat bottom, generally dish shaped pockets 34 having centrally disposed apertures therein, one pocket 34 in each flight 36 being provided for each lane L. It will be understood that the continuous operation of the singulator 22, alignment mechanism 24, and transfer mechanism 30 will place an oriented apple in each pocket 34 with its stem-blossom axis disposed substantially vertical.

With the pockets 34 filled with aligned apples, the continuously moving conveyor 32 moves the apples into alignment with a stemming and coring unit 37. The apples are first moved to a centering station CS (FIGS. 1 and 8) where each apple is centered in its cup by a centering mechanism 38. The apple is then moved to a stemming station SS where the cavities or indents in both the stem end and blossom end of the apple are engaged by centering means to positively align the stem-blossom axis of the apple with an associated stemming tube 40 of a stemming unit 42 and to hold the apple in this position until the stemming tube has penetrated a considerable distance into the apple.

After insertion of the stemming tube 40 completely through the apple, and removal of the stem material from the stemming tube 40 and the stemming tube from the apple, the apple is moved into a coring or seed cell removing station SCS. While at this station, the stem-blossom axis of the apple is again centered and the rotating cutter 44 (FIG. 8) of the associated coring unit 46 is moved through the cylindrical stem opening in the apple to the vertical mid-point of the apple before being moved outwardly a distance sufficient to remove all the seed cell material from the apple. The height of the apple being processed is used as a gauge to locate the mid-point of the apple and also to determine the diameter of cut of the rotating seed cell cutter 44.

The cored apple is then moved to a washing station WS where all core material, if any, remaining in the cavity cut in the apple is removed by a stream of water under pressure directed into the apple through a washing tube 48. The cored apple is then discharged from the machine 20 by any suitable means such as a discharge conveyor 50.

As will be explained in more detail hereinafter, the centering mechanism 38, the stemming unit 42, the coring unit 46, and the washing tube 48 are all mounted for vertical and horizontal movement on a swinging carriage 52. The carriage 52 swings over the conveyor 32 in such a way that each tool or unit is lowered, remains in alignment with, and moves at the same horizontal speed as the apple being operated upon while each unit performs its particular function on the apple. The tools are then raised and are swung back over the conveyor 32 before again being lowered into operative position on the next following apples.

Since the mechanisms associated with each lane L are identical, wherever possible in the detailed description to follow reference will be made to the mechanisms associated with only one lane.

The orienting mechanism 24 (FIGS. 1 to 4) comprises an upwardly inclined floor 60 (FIG. 3) with a downwardly inclined feed chute 62 integrally formed on the inlet end thereof and arranged to receive transverse rows of apples from the singulator 22. The floor 60 and chute 62 are divided into lanes L by upstanding guide rails 64 (FIG. 4) which serve to isolate the apples in each lane L from apples in other lanes. The floor 60 and chute 62 are supported by upper inclined frame members 65 and lower inclined frame members 66, one upper and lower member being disposed on each side of the machine. The inclined members 65 and 66 are bolted to upstanding legs 67 and 68 of a main frame 74.

While in the orienting mechanism 24, each apple is subjected to forces which tend to rotate the apple until such time as the apple assumes a stable position and comes to rest upon either its relatively flat stem end or its relatively flat blossom end. Certain of these forces are applied to the apples in each lane by a pair of apple supporting, toothed conveyor belts 76 and 78 (FIGS. 3, 3A and 4) of high speed and low speed apple twisting conveyors 80 and 82, respectively. The upper runs of the belts 76 and 78 extend through elongated slots 84 (FIG. 3) in the floor 60 and are guided along the inclined upper surface of a slide plate 85 bolted to the floor. The high speed belts 76 are trained around toothed drive pulleys 86 set screwed to a shaft 88, and around driven pulleys 90 journalled on a shaft 92. Similarly, the low speed belts 78 are trained around drive pulleys 94 set screwed to the shaft 92 and around driven pulleys (not shown) journalled on the shaft 88. The shafts are journalled in bearings 98 bolted to the lower frame members 66, and the driven pulleys are held in desired axial position on their respective shafts and separated from the adjacent drive pulleys by washers 100.

The high speed belts 76 are driven by a variable speed motor 106 which is connected to the shaft 88 by a belt drive 108, and the low speed belts 78 are driven by a variable speed motor 110 that is connected to the shaft 92 by a belt drive 112.

In order to aid the belts of the high speed and low speed twisting conveyors 80 and 82 in rotating each apple until it assumes a stable position on one of its flat ends, and in order to maintain the timing of the singulated apples, a timing conveyor 120 (FIGS. 3 and 4) is provided to positively control the movement of each apple up the inclined portion of the alignment mechanism 24 and to aid in centering the apple transversely of the twisting conveyors.

The timing conveyor 120 comprises a pair of drive sprockets 122 keyed to a drive shaft 124, and a pair of driven sprockets 126 keyed to a driven shaft 128 and disposed in planar alignment with associated ones of the drive sprockets. The shafts 124 and 128 are journalled in bearings 130 bolted to the upper frame members 65. Chains 132 are trained around the planar aligned pairs of sprockets and cooperate to support a plurality of evenly spaced, transversely extending pusher support bars 134.

A plurality of pushers 136 are rigidly supported on alternate bars 134 of the conveyor 120 and each pusher includes a stabilizing tongue 138 having a slot 139 (FIG. 3) therein within which the following support bar 134 is slidably received. It will be recognized that each alternate pusher supporting bar 134 carries one pusher for each lane L, and that the stabilizing tongues 138 engage the next adjacent bar thereby holding apple contacting arms 140 of the pushers substantially normal to the path of movement of the timing conveyor. As best shown in FIGURE 4, the forward and rear surfaces of each arm 140 are V-shaped and aid in centering the apples transversely in their associated lanes L.

The timing conveyor 120 is driven in a counterclockwise direction (FIG. 3), by drive means soon to be described, at the same speed as the processing conveyor 32 and slightly slower than the low speed twisting conveyor 82. Thus, each apple to be aligned will be confined between two of the pushers and the adjacent guide rails 64 and will be advanced upwardly through the orienting mechanism 24 at the same speed as the processing conveyor 32.

Since both twisting conveyors 80 and 82 are moving in the same direction and are moving faster than the timing conveyor 120, each apple will tend to move upwardly along the inclined supporting surface against the V-shaped apple contacting surface of the preceding pusher 136, while gravity will tend to cause the apple to roll down the inclined surface against the V-shaped apple contacting surface of the following pusher. During this time the speed difference between the two twisting conveyors 80 and 82 will apply torque to the apple tending to rotate the apple about an axis normal to the inclined surface of the twisting conveyors. These forces acting on the apple cooperate to rotate the apple until a flat spot of the apple, i.e., the stem end or the blossom end of the apple, comes to rest upon the support surface of the twisting conveyors 80 and 82. When in this stable position, the difference in speed of the twisting conveyors acting on the stable apple is not sufficient to upset the stable condition of the apple.

The aligned apple is then moved either by the downstream pusher 136, or by the two twisting conveyors 80 and 82 which support the apple, to a dead plate 144 (FIGS. 3 and 4) which extends transversely of the conveyors and resists movement of the apple until the following pusher 136 pushes the oriented apple over the dead plate 144. It will be appreciated that the dead plate 144 delays the apple until the downstream pusher 136 advances it past the dead plate in proper timed relation with other operating components of the apple processing machine.

After being pushed over the dead plate 144, the apple moves onto the spacing conveyor 25. The spacing conveyor comprises three longitudinally extending endless belts 152 for each lane L. Each belt 152 is trained around a toothed drive pulley 154 (FIG. 3) keyed to a drive shaft 156, and around a toothed driven pulley 158 keyed to a driven shaft 160. The shafts 156 and 160 are journalled in pairs of bearings bolted to the main frame 74 of the machine.

The upper runs of the belts 152 extend through slots 166 (FIG. 4) in a horizontal extension 60a of the floor 60 and are slidably supported by a slide plate 167 bolted to the floor extension 60a. Guide rails 64a, which are extensions of the rails 64, retain the apples within their respective lanes L. The upper rungs of the belts of the spacing conveyor are driven toward the right (FIG. 3) at a speed slightly faster than the speed of the timing conveyor 120 so as to space adjacent apples in each lane a sufficient distance to permit operation of the transfer mechanism 30 without interference between the jaws thereof and the next downstream apple. The spacing conveyor 25 advances each apple, in turn, onto the aforementioned dead plate 26 for reception by the associated jaws 28 of the transfer mechanism 30. The transfer mechanism then places the oriented apple into one of the pockets 34 of the main processing conveyor 32.

The processing conveyor 32 comprises a pair of drive sprockets 170 (FIG. 8) keyed to a drive shaft 172, a pair of driven sprockets 174 (FIG. 3) keyed to a driven shaft 176, and a pair of idler sprockets 178 keyed to an idler shaft 180. The shafts 172 and 176 are journalled in bearings bolted to the main frame 174. The idler shaft 180 is journalled in bearings 184 mounted for vertical adjustment on the main frame 74 so as to apply the proper tension to endless chains 186 and 188 which are trained around planar aligned ones of the sprocket 170, 174 and 178 disposed on the left and right sides (FIG. 2) of the apple processing machine 20, respectively. The previously mentioned conveyor flights 36 (FIG. 6) having the pockets 34 formed therein, are bolted to transversely aligned links of the chains 186 and 188.

The upper runs of the processing conveyor 32 and the spacing conveyor 25, and the lower run of the timing conveyor 120 are all driven in timed relation toward the right as viewed in FIGURE 1 by a main drive system 192 (FIGS. 1 and 2). The main drive system 192 receives its power from a motor 194 (FIG. 2) which drives a speed-change mechanism 196 by a belt drive 198. The output of the speed-change mechanism 196 is coupled to a cam shaft 200 (FIG. 1) journalled in the main frame 74 of the machine. An inclined shaft 202, journalled in bearings 204 bolted to the frame 74, is driven from the cam shaft 200 by meshing bevel gears 206 and 208 which are keyed to the shafts 200 and 202, respectively. The lower end of the inclined shaft 202 has a bevel gear 209 keyed thereon which gear is in meshing engagement with a bevel gear 210 keyed to the drive shaft 172 of the processing conveyor 32 thereby completing the drive to the main processing conveyor.

The driven shaft 176 of the processing conveyor 32 has a large diameter gear 212 (FIGS. 1 and 4) keyed thereon, which gear meshes with a small diameter gear 214 keyed to a crankshaft 216 that extends transversely of and is journalled on the main frame 74 of the machine. The gears 212 and 214 are of such a size that the crankshaft 216 is driven one complete revolution each time a flight 36 on the processing conveyor 32 moves a distance equal to the spacing of the flights.

The spacing conveyor 25 is driven from the crankshaft 216 by a gear drive 218. The gear drive 218 includes a drive gear 220 (FIG. 3) keyed to the shaft 216 and a driven gear 222 keyed to the drive shaft 156 of the spacing conveyor 25.

The movable shuffles of the shuffle feed singulator 22 are connected to an arm 224 (FIG. 1) that is keyed to a shaft 228 journalled in bearings 230 bolted to the frame 74 of the machine. A second arm 226 that is keyed to shaft 228 is pivotally connected to one end of a link 231, while the other end of the link 231 is pivotally connected to a crank pin 232 secured to and projecting outwardly from a disc 234 that is keyed to the crankshaft 216. Thus, each revolution of the crankshaft 216 will cause the shuffle feed singulator 22 to move a transverse row of apples into the orienting mechanism 24.

The timing conveyor 120 is driven from the crankshaft 216 (FIG. 4) by a chain drive 236 which includes a sprocket 238 keyed to the shaft 216, a sprocket 240 keyed to the shaft 124, and the chain 242 trained around the sprockets. The sprocket size is selected so that one transverse row of apples are moved onto the spacing conveyor 25 each time a flight 36 of the processing conveyor 32 moves a distance equal to the spacing between these flights.

The transfer mechanism 30 (FIGS. 1, 2, 3 and 5) is provided in order to transfer each apple from the dead-plate 26 (FIG. 3) into one of the pockets 34 of the continuously moving processing conveyor 32. The transfer mechanism 30 comprises a substantially vertical oscillating frame 260 which includes a pair of upstanding arms 262 (FIG. 3) and 264 (FIG. 1) keyed at their upper ends to a shaft 266 journalled in bearings 268 bolted to the main frame 74. A pivot shaft 270 is connected to the lower ends of the arms 262 and 264. The pivot shaft 270 pivotally supports one end of a generally horizontal frame 272 which includes a pair of longitudinally extending arms 274 and 276 interconnected by a transversely extending angle member 278.

As best shown in FIGURE 5, each pair of jaws 28 is pivotally mounted on a bracket 280 which includes a pair of vertical plates 282 and 284 welded to an angle spacer 286. The angle spacers 286 are bolted to an elongated, transversely extending angle member 288 and are positioned in alignment with their associated lanes. In order to maintain the lower edges of the brackets 280 substantially horizontal during operation of the transfer mechanism 30, the two end brackets 280 are pivotally connected to the adjacent arms 274 and 276 by bolts 290. The lower ends of upright stabilizing arms 292 and 294 are bolted to the transverse angle members 288 near the ends thereof, and the upper ends of the arms are pivotally connected by links 296 and 298, respectively, to the arms 262 and 264 of the oscillating frame 260. Thus, it will be seen that the links 296 and 298; the horizontal arms 274 and 276; and the vertical arms 262, 264, 292 and 294 cooperate to define a parallelogram linkage.

Each pair of jaws 28 (FIG. 5) comprises a generally T-shaped actuating lever 300 which is pivotally mounted on a pin 302 supported by the associated bracket 280. One arm 304 of the actuating lever 300 has one of the jaw elements 28a bolted thereto, and another arm 306 of the lever 300 has a cam follower 308 journalled thereon. A bell crank 310 is pivotally mounted on a pin 312 supported by the bracket 280 and includes a forked arm 314 which engages the cam follower 308. A second arm 316 of the bell crank 310 has the other jaw element 28b bolted thereto. Thus, actuation of the lever 300 will cause each jaw element 28a and 28b to move equal amounts in opposite directions.

In order to actuate each pair of jaws 28 in timed relation with the movement of the processing conveyor 32, a jaw cam 322 (FIG. 2) is keyed to the cam shaft 200 and pivotally actuates the rocker arm 324 (FIG. 1), which rocker arm is pivoted on a shaft 325 journalled in bearings bolted to the frame of the machine. The rocker arm 324 is connected to one end of a bell crank 326 by a link 327. The bell crank 326 is pivotally mounted on the shaft 266, and its other end is pivotally connected by a link 328 (FIGS. 3 and 5) to a lever 330 keyed to the shaft 270. A plurality of levers 332, one for each lane L, are keyed to the shaft 270 and each lever is pivotally connected to the actuating arm 334 of the associated T-shaped actuating lever 300 by a telescopic link 336.

Each link 336 comprises a tubular member 338 that is pivotally connected to the arm 334, and a rod 340 that is pivotally connected to the associated lever 332. A pin 342 secured to the rod 340 extends through slots 343 in the tubular member 338 and acts as a stop for one end of a compression spring 344. The other end of the spring 344 abuts one of a pair of lock nuts 346 screwed onto the tubular member 338. Thus, it will be seen that the pivotal movement of the shaft 270 through a predetermined arc in a counterclockwise direction (FIGS. 3 and 5) will cause movement of the link 336 toward the left (FIG. 3) causing the jaw elements 28a and 28b to move toward each other and grip an apple. After the apple has been gripped, the spring 344 will permit continued pivotal movement of the shaft 270 without movement of the associated jaws.

The contour of the cam 322 is diagrammatically illustrated in the transfer mechanism timing diagram shown in FIGURE 24. In this diagram, each ten degrees of cam travel is illustrated along the horizontal axis, and the vertical displacement of the jaw opening and closing curve 322a represents the separation of the jaw elements when an apple is not positioned therebetween. It will be appreciated that each complete revolution of the cam 322 is completed while the processing conveyor is moving approximately four inches.

The vertical frame 260 is oscillated back and forth in timed relation with the movement of the components of the machine by a cam 350 (FIG. 2) keyed to the cam shaft 200 and having a cam contour 350a as illustrated in FIGURE 24. The cam 350 pivotally actuates a rocker arm 352 journalled on the shaft 325. A link 353 pivotally connects the rocker arm 352 to a lever 354 keyed to the shaft 266.

Similarly, the several pairs of jaws 28 are raised and lowered in timed relation with the movement with the other components of the machine by a cam 356 (FIG. 2) keyed on the cam shaft 200 and having a cam contour 356a as illustrated in FIGURE 24. The cam 356 pivotally actuates a rocker arm 358 journalled on the shaft 325. A link 359 pivotally connects the rocker arm 358 to an arm 360 which is keyed to a shaft 362 journalled in bearings 364 bolted to the frame of the machine. A pair of substantially horizontal arms 366 are keyed to the shaft 362 and are pivotally connected to the arms 274 and 276 of the horizontal frame 272 by a pair of telescoping links 368. The links 368 are similar in construction to the links 336 and therefore will not be described in detail.

In order to assure that all apples are properly oriented in the associated pockets 34, one or more operators may be positioned between the transfer mechanism 30 and the stemming and coring unit to orient any apple which is not supported on one of its ends.

After the orienting mechanism 24 has oriented each apple so that it is supported on one of its relatively flat ends, and after the transfer mechanism 30 has transferred each apple and placed it in one of the pockets 34 of the conveyor 32 on one of its ends, each apple in turn must be registered with the apple stemming and coring unit 37 (FIG. 8). Each apple is first centered at the centering station CS of the unit 37, then aligned and stemmed at the stemming station SS, thereafter realigned and cored at the seed cell station CSC, and finally washed to remove the core material therefrom at the washing station WS.

In order to properly register each centering mechanism 38, stemming unit 42, and coring unit 46, with the associated pockets 34 of the continuously moving conveyor 32, the stem units are supported by the oscillating carriage 52 best shown in FIGURE 7. The carriage 52 comprises a pair of spaced, parallel, vertically extending side members 382 of irregular shape, only one being shown in FIGURE 7. As diagrammatically shown in FIGURE 7, the side members 382 are each in the form of plates with one member being positioned parallel to and spaced slightly outward from one side of the processing conveyor 32 and the other member being spaced slightly outward from the other side of the conveyor. Although in practice, the side members 382 are provided with cut-outs, as illustrated in FIGURE 1 to lighten the carriage 52, the side member 382 has been shown in FIGURE 7 as a solid plate for clarity of illustration. The side members are interconnected by transversely extending channel members 384, 386, 388, 390, 391, 392 and 394 to provide a rigid carriage construction.

The carriage 52 is mounted for oscillating movement by a pair of forward rocker arms 396, and by a pair of rear rocker arms 398. The upper ends of the rear rocker arms 398 are keyed to a shaft 400 journalled on the frame 74 of the machine, while the lower ends of these arms are each pivotally connected to the adjacent side members 382 by pins 402. The forward rocker arms 396 are welded at their upper ends to a large diameter tubular shaft 404 which is journalled on the frame 74 of the machine. The lower ends of these arms are pivotally connected to the adjacent side members 382 by pins 406.

The carriage 52 is oscillated in timed relation with the movement of the conveyor 32 by a cam 408 (FIG. 2) keyed to the camshaft 200, which cam pivotally actuates a lever 410 (FIG. 7) that is welded to the tubular shaft 404. The contour of the cam 408 is illustrated by the curve 408a in FIGURE 25. The upward portion of the curve 408a indicates that the carriage is moving forward at the same speed as the conveyor 32, and the sharp downwardly portion indicates that the carriage 52 is moving in a direction opposite to that of the conveyor 32.

The carriage 52 (FIG. 7) carries a vertically reciprocating stemming tube carrier 412 which is shown in solid lines in its upper position and in phantom lines in its lowermost position. The carrier 412 is of welded construction and includes side members 416 (only one being shown in FIG. 7) each of which includes vertical angle members 418, 420 and 422, which vertical members are interconnected by a longitudinally extending horizontal angle member 424 and an inclined angle member 426. The two spaced side members 416 are secured to transverse angle members 428 and 430, to a coring unit anchor member 431, and to a transverse channel 432. A plurality of transversely extending tool holders 434 are secured to the channel 432 by a plurality of brackets 436, only one being shown in FIG. 7. A lower pair of channel tool holders 438 and 440 are supported by brackets 442 secured to associated ones of the vertical angle members 418.

In order to guide the carrier 412 for vertical movement the carrier 412 has a pair of axially aligned collars 446 welded to each side member 416. Each pair of axially aligned collars 446 is slidably received on a vertically extending rod 448 that is rigidly bolted to the associated side member 382 of the carriage 380 by brackets 415.

The carrier 412 is vertically reciprocated in timed relation with the other components of the machine by a cam 452 (FIG. 2) which is keyed to the camshaft 200. The cam 452 actuates a lever 454 (FIG. 8) which is secured to a rock shaft 456 journalled in the frame 74 of the machine. Three spaced arms 458 (FIG. 2), each have one end welded to the rock shaft 456 and the other end welded to a stiffening member 452 which interconnects the three arms. The two outer arms 458 are each pivotally connected by an adjustable link 460 (FIG. 8) to the associated side of the carrier 412.

As illustrated by the cam curve 452a (FIG. 25), at the start of the cycle of operation, the stemming tube frame 412 and the tube 40 moves downwardly and thereafter upwardly, dwelling at the upper portion when the carriage 52 is moving in a reverse direction.

The carriage 52 (FIG. 7) also supports a stem ejector rod actuator 466 for vertical movement relative thereto, which carrier is shown in its uppermost position in full lines and in its lowermost position in phantom lines in FIGURE 7. The actuator 466 includes side members 468 (only one being shown in FIGURE 8) each having a pair of collars 470 and 472 slidably received on the associated rod 448. The two side members 468 are interconnected by a transversely extending plate 474 and by angle members 476 and 478.

The actuator 466 is vertically reciprocated in timed relation with the movement of the other components of the machine by a cam 480 (FIG. 2) which is keyed to the camshaft 200. The cam 480 actuates a lever 482 (FIG. 8) which is secured to a shaft 484 journalled in the frame 74 of the machine. A pair of spaced arms 486 are welded to the shaft 484, and the free end of each arm is pivotally connected to the actuator 466 by a link 488. The contour of the cam 480 is indicated by the curve 480a in FIGURE 25, which illustrates that the actuator 466 is in an elevated position at all times except for a short interval adjacent the 180° position of the cam 480.

In order to positively maintain the carriage 52 in desired alignment with the processing conveyor 32 during its movement in the same direction as the conveyor 32, a pair of vertically extending registering rods 490 (FIG. 7) are associated with each side member 382. Each pair of rods 490 is slidably received in holes in a flange 492 secured to each side member 382, in aligned holes in the channel member 392 of the carriage 380, and in aligned holes in the channel tool holder 440 of the vertically movable carrier 412. Each rod 490 has a stop nut 494 screwed on its upper end, and a collar 496 secured to an intermediate point thereon, as by pinning. A compression spring 498 is fitted around each rod 490 and is disposed between the collar 496 and the lower surface of the associated flange 492.

Thus, it will be seen that when the actuator 466 is in its uppermost position, and the carriage 52 is moving in a direction opposite to the direction of movement of the conveyor 32, the lower ends of the rods 490 (FIG. 6) will be spaced above the conveyor. When the carriage 52 and conveyor 32 are moving in the same direction, and the actuator 466 is moved to its lowermost position, the springs 498 will force each rod 490 down until the stop nuts 494 terminate further downward movement of the rods and the lower end of each rod becomes positioned in the hole 500 formed in the adjacent end of the particular conveyor flight 36 that is positioned therebelow, thereby positively locking or registering the carriage 52 with the conveyor 32. Each conveyor flight 36, in turn, is locked in the above described manner to the carriage 52 when the several processing tools supported by the carriage are moved into engagement with the apples being processed.

As indicated in FIGURES 7, 8 and 9, each side member 382 of the carriage 52 has an extension 504 bolted thereto, which extension projects downwardly past the adjacent side of the conveyor 32 to a point below the upper run thereof. A centering pin frame 506 comprises a pair of T-shaped side members 508 welded to a transversely extending angle member 510 which supports a plurality of centering pins 514. One pin 514 is provided for each lane L, and each pin is pivoted upwardly through the aperture in the associated pockets 34 for the purpose of locating the lower end cavity of the associated apple and for supporting and centering the lower end of the apple during a major portion of the stemming operation. As clearly shown in FIGURE 9, the frame 506 is pivotally connected to each extension 504 by a pin 512.

The centering pin frame 506 is pivoted in timed relation with the movement of the other components of the machine by a cam 516 (FIG. 2) which is keyed to the camshaft 200. The cam 516 actuates a lever 518 (FIG. 8) which is secured to a shaft 520 journaled in the frame 74 of the machine. A pair of arms 522 are secured to and project outwardly from the shaft 520, and each arm 522 has its free end pivotally connected to one end of a link 524. The other end of each link 524 is pivotally connected to the associated T-shaped side member 508 as shown in FIGURE 9.

As illustrated in FIGURE 25, the curve 516a indicates that the centering pin is raised to center and support the apple until such time as the stemming tube 40 becomes positioned immediately adjacent the upper end of the pin 514.

The lower end of each side extension 504 carries a horiontal bracket 504a having an apertured block 525 bolted thereto. Each pair of blocks 525 slidably receives a vertical shaft 526 of a recentering pin frame 527, and the shafts 526 have a transversely extending channel member 528 rigidly secured thereto. The channel member 528 has a plurality of upstanding recentering pins 530 secured thereto, one pin being provided for each lane L and being disposed in alignment with the opening in its associated pocket 34 when the carriage 52 is registered with the conveyor 32. As will be described in more detail later, each recentering pin 530 is disposed in axial alignment with the associated coring unit 46 (FIGS. 20 and 21) and is reciprocated vertically upward immediately after the carriage 52 registers with the conveyor 32 to locate the cylindrical core opening in the apple and to realign the stem-blossom axis of the apple so that the seed cell or coring cutter 44 of the coring unit 46 will enter the core of the apple without damage to the edible portion of the apple.

The recentering pin frame 527 is vertically reciprocated in timed relation with the other components of the machine by a cam 532 (FIG. 2) which is keyed to the camshaft 200. The cam 532 actuates a lever 534 (FIGS. 1 and 8) that is welded to a shaft 536 journalled in the frame 74 of the machine. A pair of spaced arms 538 are welded to the shaft 536 and are pivotally connected to opposite sides of the recentering pin frame 527 by links 540.

As illustrated by the cam curve 532a (FIG. 25), the cam 532 causes the recentering pins 530 to move upwardly through the apertures in the associated pockets 34 and through the stem cavity in the associated apples immediately after the carriage 52 completes its reverse movement. As the cutter 44 enters the stem cavity, each pin moves out of the cavity as illustrated in FIGURES 22 and 23.

One of the centering mechanisms 38 (FIGS. 8 and 11) of the stemming and coring unit 37 is provided for each lane L, and each mechanism 38 comprises a frusto-conical centering head 546 that is screwed onto a vertically extending shaft 548 having a large diameter weighted collar 550 secured to its upper end with a resilient washer 552 bonded to its lower surface. The shaft 548 is mounted for vertical movement in a flanged bearing 554 that is bolted to the tool supporting channel 394 of the oscillating carriage 52. The resilient washer 552 of the collar 550 normally rests against the channel tool holder 438 of the stemming tube carrier 412.

With the carriage 52 interlocked with and moving in the same direction as the conveyor 32, the shaft and conical head 546 will be disposed in axial alignment with an associate pocket 34 of the conveyor. Downward movement of the carrier 412 permits the weighted collar 550 to move the shaft and conical head 546 downwardly against the upper portion of an apple supported on the associated pocket 34. The weight and configuration of the conical head 546 will shift the apple in its pocket so that the upper end of the oriented apple will be centered relative to the pocket 34. The conical head 546 will remain in its apple centering position until the carrier 412 first completes its downward stroke and then moves upwardly to a position causing the channel tool holder 438 to engage the resilient washer 552 and return the centering mechanism 38 to its inactive, elevated position shown in FIGURE 11. It will be noted that openings 556 are formed in the tool holder 438 which are of sufficient size to permit a portion of the bearing 554 to project therethrough when the carrier 412 is in its lowermost position.

Even though the centering mechanism 38 adequately centers the upper end of the oriented apple within its associated pocket 34, it will be appreciated that in many cases the stem-blossom axis of the oriented apple is not perpendicular to the horizontal supporting surface of the pocket 34 as illustrated in FIGURE 12. Accordingly, it is an important feature of the present invention to provide means for positively aligning the stem-blossom axis of the apple with the stemming tube 40 and support the apple in this aligned position while the stemming tube is being moved through the major portion of the apple.

In accordance with the present invention, the lower end of a stem ejector rod 558 (FIGS. 11 and 13) is first lowered into engagement with the indent on the upper end of a centered and oriented apple, and shortly thereafter the associated centering pin 514 locates and centers the lower indent, and aligns the stem-blossom axis of the apple with the axis of the stemming tube 40. As indicated in FIGURE 14, the pin 514 supports the fruit until the stemming tube 40 approaches the lower end of the apple. The pin 514 is then swung out of the way of the stemming tube and the tube forces the apple against the associated pocket 34 and thereafter completes its movement through the apple as indicated in FIGURE 15. The stem ejector rod 558 is then forced downwardly until its lower end pushes the severed stem material completely through the stemming tube 40.

As best shown in FIGURES 8 and 11, the stemming tube 40 is rigidly secured to the upper tool holder 434 of the stemming tube carrier 412 and is disposed in axial alignment with the associated apertured pocket 34 when the carriage 52 is locked to the conveyor 32 by the carriage registering rods 448. The stem ejector rod 558 is slidably received within the stemming tube 40 and has a collar 560 and a resilient washer 562 rigidly secured to its upper end. The resilient washer 562 normally rests against the upper surface of the tool holder 434 as shown in FIGURE 10.

In order to prevent the stem material, after it has been pushed out of the lower end of the stemming tube 40, from adhering to the lower end of the stem ejector rod 558, water under pressure is directed through a flexible conduit 564, through a pasasge 566 in the collar 560, and through an axial bore 568 (FIG. 15) in the rod 558. The pressure exerted by the water positively dislodges the stem material from the rod.

Since upward movement of the stemming tube 40, after the tube has been forced through the apple, tends to lift the apple from its supporting pocket 34 of the conveyor 32, an apple seater 570 is provided to prevent the apple from lifting from the conveyor 32. The apple seater 570 (FIG. 11) includes a tubular body 572 which is slidably mounted around the stemming tube 40 and within a flanged bearing 574 that is bolted to the tool holder 394 of the oscillating carriage 52. A large diameter collar 576 with a resilient washer 578 bonded to its lower surface is secured to the upper end of the tubular body 572 and is positioned above the tool holder 440 of the vertically reciprocating carrier 412. An apple engaging collar 580 is secured to the lower end of the tubular body 572.

It will be appreciated that during downward movement of the carrier 412, the fruit seater 570 will also move downwardly until the collar 580 engages the upper surface of the apple. The fruit seater is then prevented from further downward movement and is held by gravity on the upper surface of the apple until the carrier 412 and stemming tube 40 complete their downward movement and the stem material is severed from the apple. Upward movement of the stemming tube 40 tends to lift the apple and the fruit seater 570, however, a locking device 584 (FIG. 8) prevents such upward movement until the stemming tube 40 has been completely withdrawn from the apple. After the stemming tube has been withdrawn from the apple, the locking device 584 releases the fruit seater 570 permitting the seater to be moved to the uppermost position shown in FIGURE 10 upon subsequent engagement of the tool holder 440 with the resilient washer 578.

The specific construction of the locking device 584 forms no part of the present invention and is fully disclosed in the aforementioned Anderson et al. application, Ser. No. 221,174. If a more detailed description of the device is desired, reference may be had to said application.

The structure for forcing each stem ejector rod 558 through the associated stemming tube 40 when the tube is in its lowermost position comprises a push rod 588 which is rigidly secured to the stem ejector rod actuator 466 by brackets 590 and 592. A collar 594 is rigidly secured to the lower end of the rod 588 and has a resilient pad 596 bonded to its lower surface. After the stemming tube 40 has been moved completely through the apple to the position shown in FIGURE 15, the actuator 466 and push rod 588 are moved downwardly causing the pad 596 to engage the collar 560 of the stem ejector rod 558 and force the rod through the stemming tube 40. The stem material is discharged from the stemming tube 40 in this manner, and such discharge is aided by the previously mentioned high pressure water which flows through the rod 588.

As best shown in FIGS. 1 and 10, a pivotal stop frame 598 is provided to hold the stem ejector rod 558 in an elevated position wherein the lower end of the rod is spaced from the associated centering pin 514 when an apple is not present in the pocket 34 disposed therebelow. The frame 598 (FIG. 10) comprises a pair of arms 600 pivotally connected to the adjacent side members 382 of the carriage 52 by pivot pins 602. The arms 600 are interconnected by an angle member 604 which is spaced rearwardly from the stem ejector rods 558 associated with the several lanes L of the machine as shown in FIGURE 11, but which is positioned to be engaged by one edge of each of the resilient washers 562 that are bonded to the collars 560 associated with each of the stem ejector rods. A spring guide bolt 606 is screwed into each of the adjacent side members 382 and is slidably received within apertured angle brackets 608 welded to the adjacent arms 600. A compression spring 610 is wound around each bolt 606 and is disposed between the angle brackets and the head of the associated bolt and normally resiliently holds the frame 598 in a horizontal position as shown in FIG. 11. When each stem ejector rod 558 is shoved to its lowermost position by the push rod 588, it will be appreciated that the frame 598 will pivot downwardly against the urging of the springs 610.

After the stem material has been removed from an apple in each lane, the apples are advanced into the coring or seed cell removing station SCS where a coring unit 46 is provided for each lane L. Each coring unit 46, in cooperation with the associated recentering pin 530, recenters the associated apple and cuts the seed cell therefrom in accordance with the height of the apple.

Each coring unit 46 (FIGS. 11, 16, 17, 18 and 19) includes a main body 616 which is rigidly secured to a pair of rods 618 by set screws. The lower ends of the rods 618 are slidably received in ears 620 projecting outwardly from a bracket 622 that is bolted to the channel member 391 of the oscillating frame 52. A coring unit arresting rack 624 is formed on the bracket 622 as clearly shown in FIGURE 16. The rods 618 are also slidably received in holes in a guide-bar 626 bolted to the channel member 390 and in slots (not shown) formed in the channel member 432 of the vertically reciprocable stemming tube carrier 412. The upper end of each pair of rods 618 is rigidly secured to a support plate 628 which is independent of similar plates 628 connected to the rods associated with other lanes L. A spring 630 is wound around each rod and is disposed between the bar 626 and the main body 616 of the associated coring unit 46. The springs are provided for cushioning upward movement of the coring unit 46 and to overcome lag during initial downward movement of the unit.

Since many of the components of the coring unit 46 are substantially the same as the components of the coring unit described in the above mentioned Anderson et al. application, only those parts which differ will be described in detail. If a more detailed description of these parts is desired, reference may be had to the copending application.

In general, each coring unit 46 comprises the main body 616 (FIG. 17) which includes a tubular housing 632 terminating at 634. A cutter shaft 636 is continuously driven by a motor 638 (FIG. 8) which drives a gear head 640 that drives a plurality of flexible shafts 642, one being connected to said cutter shaft 636 of each coring unit. The upper end of the cutter shaft is journalled in the body 616 and includes a downwardly projecting tubular portion 636a with a pair of diametrically opposed vertical slots 637 formed in the lower part thereof. A transversely extending cutter pivot pin 643 is locked in the lower end of the tubular shaft portion 636a and pivotally supports the shank 44a of the seed cell or coring cutter 44. The upper end of the cutter shank 44a is provided with an inclined knife actuating slot 644, which shank is slidably received in the lower slotted end of a vertically movable cutter actuating shaft 646. A transverse cutter actuating pin 648 is secured to the slotted portion of the cutter actuating shaft 646 and is slidably received within the inclined slot 644 at the upper end of the cutter shank.

The cutter actuating shaft 646 is moved upwardly, and accordingly the cutter is pivoted from a position concentric with the axis of the cutter shaft 636 as shown in FIGURE 17 to a seed cell cutting position spaced outwardly from the axis as shown in FIGURES 18 and 19, by pivoting a cutter control arm 650 downwardly about a pivot shaft 652. The structure for interconnecting the arm 650 with the cutter actuating shaft 646 is fully disclosed in the aforementioned copending Anderson application.

A depth control mechanism 660 includes a tubular control housing 662 slidably supported on the external surface of tubular housing 632. A flanged sleeve 664 is rigidly secured, as by bolting, to the lower end of the control housing 662. The sleeve 664 clamps a pair of annular bearing rings 666 (FIG. 17) and a spacer ring 668 between the lower end of the control housing 662 and an inwardly extending flange 670 on the lower sleeve 664. An end cutter holder 672 includes an upper vertically slotted portion 674, a lower tubular portion 676 integral therewith, and an annular flange 678 received for rotation between the bearings 666. The slotted portion 674 receives a portion of the cutter shank 44a and is provided with a vertical slot 680 for receiving the cutter pivot pin 643 permitting the holder 672 to reciprocate vertically relative to the pin 643 and effecting a drive connection between the pin 643 and the holder. A pair of diametrically opposed end cutters 684 (only one being shown) are secured to the lower end of the holder 672 and serve to provide a frusto-conical cut in the upper end of the apple which aids in directing wash water into the apple during a subsequent operation.

An annular apple seater 694 is rigidly secured to an apertured support plate 698 of a pawl carrier 700. The pawl carrier includes a vertically extending pawl frame 702 that pivotally supports a ratchet pawl 704 about a pivot pin 706. A compression spring 708 is disposed between a horizontal member 710 of the frame 702 and the pawl 704. The pawl frame 702 is rigidly secured to a pair of vertically extending rods 711 which are slidably received in a aligned lower pairs of ears 712 formed on the sleeve 664 and upper ears 714 (FIG. 18) formed in a block 716 of the housing 662. A vertically extending apertured pin 717 is threaded to the block 716 and is slidably received within an air passage 718 formed in the body 616 of the coring unit 46.

As above described, the coring unit 46 is substantially the same as that described in the aforementioned Anderson et al. application and its operation is generally as follows. With the carriage 52 interlocked with and moving in the same direction as the conveyor 32, the vertically movable carrier 412 and coring cutter 44 move downwardly as indicated by the curves 452a and 44b in FIGURE 25. During the initial portion of the downward move, the cutter control arm 650 does not rotate about the pivot shaft 652 since its free end is also moving downwardly because it is pivotally anchored to the carrier 412 (FIGS. 8 and 18) by a link 720. When the apple seater 694 contacts the upper end of the apple, the downward movement of the seater and pawl frame 702 is terminated. However, the tubular control housing 662 and the main body 616 continues to move downwardly. The control housing 662 continues to move downwardly until the lower surface of the block 716 engages the upper surface of the ratchet pawl 704. The tooth 704a of the pawl 704 then engages the opposed tooth of the coring unit arresting rack 624 thereby terminating downward movement of the control housing 660, all as described in detail in the aforementioned Anderson et al. application.

In order to hold the apples from rotation during the seed cell removing operation, a feature of the invention is to provide the annular apple seater 694 with an annular resilient pad 724 bonded to its lower surface and disposed in position to engage the upper surface of an apple to be cored. It is important to note that a plurality of pins 726 (FIGS. 20–23) are bonded in the pad 724 and are caused to penetrate the apple and aid in holding the apple from rotation.

Another important feature of the present invention is to provide a depth control device 728 (FIGS. 16 and 18) which is responsive to the height of the apple being cored and which will permit the main body 616 and cutter 44 to continue moving downwardly until the cutter 44 reaches the vertical mid-point of the apple at which time downward movement is terminated. The position at which the depth control device 728 terminates downward movement of the main body 616 also controls the diameter of cut made by the cutter 44.

With the main body 616 held from further downward movement by the depth control device 728, continued downward movement of the carrier 412 causes the arm 650 to pivot about the shaft 652 in a clockwise direction thereby pulling the cutter actuating pin 648 upwardly and swinging the cutter outwardly to a diameter sufficient to remove the seed cell material from the apple but insufficient to remove a substantial amount of edible meat from the apple.

The depth control device 728 (FIGS 16, 17, 18 and 19) comprises an actuating arm 730 having a forked end 731 pivotally connected on studs 732 that are secured to and project outwardly from opposite sides of the tubular control housing 662. The outer end of the actuating arm 730 is pivotally connected to a link 734 by a pin 736, and the link is pivotally supported on a shaft 738 that extends transversely of and is secured to the side members 382 of the carriage 52. A depth control cam 740 is bolted to the actuating arm 730 and has a resilient cam pad 742 bonded to its camming surface 744. Each stud 732 of the control housing 662 has a roller 746 journalled thereon, and the rollers 746 are slidably received in associated vertical slots 748 in vertically extending legs 750 of a coring unit stop bracket 752. The stop bracket 752 is bolted to the main body 616 of the coring unit 46 and includes the vertically extending legs 750 which are each welded to an upwardly inclined arm 755. The free ends of the arms 755 are connected together by a stop pin 756 which is disposed in position to be engaged by the resilient covering 742 of the cam 740.

The operation of the depth control device 728 is as follows. After the resilient pad 724 and pins 726 of the apple seater 694 engages and hold the apple from rotation, and after the downward movement of the tubular housing 662 of the pivot control mechanism 660 has been terminated by engagement of the pawl 704 with the associated rack 624, the main body 616 and stop bracket 752 of the coring unit continue to move downwardly until the stop pin 756 engages the cam pad 742. It will be noted that the downward movement of the depth control housing 662 is terminated in accordance with the height of the apple, and upon termination of such movement the cam 740 will be held in a fixed position. The contour of the camming surface 644 is so formed that upon contact of the pin 756 with the resilient cam pad 742, the cutter 44 will be disposed at the vertical mid-point of the apple as indicated in FIGURES 18 and 19.

When the vertical mid-point of the apple has been located as above described, downward movement of the main body 616 is terminated. However, the carrier 412 continues to move downwardly thereby causing the link 720 to pivot the cutter control arm 650 in a clockwise direction (FIG. 18). This pivotal movement causes the rotating cutter 44 to swing outwardly until the carrier 412 reaches its lowermost position. Since the rotating cutter starts to swing outwardly to sever the seed cell from the apple at the moment the downward movement of the main body 616 is terminated, it will be appreciated that the diameter of the seed cell cavity is also controlled in accordance with the height of the apple by the depth control device 728 as shown in FIGURES 18 and 19.

As shown in FIGURE 17a, the cutter 44 has a cross-section which includes a substantially semi-cylindrical portion which is only slightly smaller in diameter than the stem cavity of the apple as indicated by the phantom line 759. It has been discovered that a cutter having such a cross section and having a substantially circular guiding surface 44c which extends more than 180° about the cutter axis 44d, will serve to guide the cutter into the stem cavity 759 without the aid of the recentering pin 530. Accordingly, it is an important feature of the invention to provide a cutter 44 which will itself serve to recenter the apple at the seed cell station SCS without the aid of other recentering means.

Although most of the seed cell material is discharged from the apple by gravity during the coring operation, it has been found desirable, and it is a feature of the present invention, that the core cavity and stem cavity be washed at the washing station WS. Accordingly, water under pressure is directed from a supply conduit 760 (FIG. 16) on the carriage 52, through a flexible conduit 762 into the flanged sleeve 664. Some of this water flows through the lower tubular portion 676 (FIG. 17) of the cutter holder 672 to aid in washing the core material from the apple at the seed cell station SCS. However, because of restrictions within the flanged sleeve 664, most of the water is directed through the curved washing tube 48. The tube 48 is screwed into an opening in the sleeve 664, and directs a vertical stream of water into the core and stem cavity of the associated apple at the washing station WS thereby washing all the seed cell material from the apple.

Although the operation of the several components of the apple processing machine has been covered with the description of the components, a brief resume of the operation will follow. Since the operation performed on each apple is identical, the progress through the machine of only one apple will be described.

The shuffle feed singulator 24 (FIG. 1) moves the apple into the orienting mechanism 24 between adjacent V-shaped pushers 136 and upon the upper runs of the twisting conveyor belts 76 and 78 (FIGS. 3 and 3a). Since the twisting conveyors are inclined and are operating at different speeds with both speeds being faster than the movement of the pushers 136, the apple is rolled between the forward and rear pushers 136 until such time as they assume a stable position on one of its relatively flat ends. Either the V-shaped pushers 136, or the twisting conveyors 76 and 78, then move the oriented apple onto the dead plate 144 where the apple remains until the following V-shaped pusher 136 pushes the apple onto the spacing conveyor 25 in timed relation with the movement of the other components of the machine.

The spacing conveyor 25 moves the oriented apple onto the dead plate 28 and spaces the apple from other following apples. The transfer mechanism 30 then grips the apple and transfers it from the dead plate 28 onto a flat bottomed conveyor pocket 34 of the continuously moving processing conveyor 32 without disturbing the stable condition of the oriented apple.

In order to assure 100% orientation of the apples, one or two operators may be stationed between the transfer mecahnism 30 (FIG. 1) and the stemming and coring unit 47, to orient any apples which were not properly oriented by the mechanism 24 and to discard any obviously defective apples.

The conveyor 32 then moves the apple to the stemming and coring unit 37 which is periodically registered with and moves at the same speed as the conveyor 32. When at the centering station CS (FIG. 11), the conical head 546 of the centering mechanism 38 is lowered onto the apple to center the apple transversely in its conveyor pocket 34. The centering mechanism 38 is then returned to its uppermost position shown in FIGURE 11 and the apple is moved to the stemming station SS.

While at the stemming station SS, the centering pin 514 and stem ejector rod 558 (FIG. 13) engage the end cavities of the apple to align the stem-blossom axis of the apple with the axis of the stemming tube 40 (FIG. 14). The apple remains supported on the centering pin 514 until the stemming tube 40 has moved through a major portion of the apple as indicated in FIGURE 14. The pin 514 then retracts, and the stemming tube 40 is shoved completely through the apple. The stem ejector rod 558, aided by water flowing through the passage 568 in the rod 558, then forces the stem material from within the stemming tube 40 before the tube and rod are returned to the inactive position shown in FIGURE 11.

The apple is then advanced to the seed cell or coring station SCS at which time the recentering pin 530 (FIGS. 20 to 23) first enters the stem cavity to recenter the apple and thereafter withdraws from the apple permitting the cutter 44 to move to the vertical midpoint of the apple. The depth control device 728 (FIGS. 18 and 19) controls the movement of the cutter in accordance with the height of the apple so that it is disposed at the vertical midpoint of the apple before moving outward a distance, which is proportional to the height of the apple, sufficient to remove the seed cell from the apple.

The apple is then advanced to the washing station WS where the seed cell material is washed from the apple. The processed apple is subsequently discharged from the machine 20 by the discharge conveyor 50 (FIG. 1).

From the foregoing description it will be apparent that the apple processing apparatus 20 of the present invention includes a mechanism for orienting the apple on either its stem or blossom end and for thereafter aligning the stem blossom axis of the apple prior to severing the stem material and seed cell from the apple. The apparatus also includes a depth control device which is arranged to control the position of the seed cell cutter in accordance with the height of the apple so that it is disposed at the vertical midpoint of the apple and is swung outwardly in direct proportion to the height of the apple being processed.

Although the machine has been described in connection with the processing of apples, it is to be understood that the appended claims are to be construed broadly enough to cover other types of articles which are similar in shape to apples.

While one embodiment of the present invention has been shown and described, it will be understood that various changes and modifications may be made without departing from the spirit of the invention or the scope of the appended claims.

Having thus described the invention and the manner in which the same is to be used, what is claimed as new and desired to be protected by Letters Patent is:

1. In a machine for processing apples or the like, the combination of a conveyor, a plurality of pockets on said conveyor each having a centrally disposed aperture therein, each pocket having an apple supported on one of its ends therein, means for moving said conveyor along a predetermined path, support means disposed above said conveyor and moving in the same direction and at the same speed as said conveyor, a frusto-conical centering mechanism supported by said support means and having its axis concentric with the axis of the aperture in a first one of said pockets, carrier means on said support means and movable relative thereto for lowering said mechanism onto an apple in said first pocket to center said apple, a rod carried by said carrier means and concentric with the aperture in a second pocket, said rod being supported by said carrier means and being lowered thereby into the upper end cavity of a second apple in the second pocket to accurately locate the upper end of the stem-blossom axis of said second apple, a centering pin carried by said support means and disposed below said conveyor, and means for moving said pin through the aperture in said second pocket to engage the lower end cavity of the apple for accurately locating the lower end of the stem-blossom axis of the second apple and to support the apple above the surface of said pocket.

2. In a machine for processing apples or the like, the combination of a conveyor, a plurality of pockets on said conveyor each having a centrally disposed aperture therein, each pocket having an apple supported on one of its ends therein, means for moving said conveyor along a predetermined path, support means disposed above said conveyor and moving in the same direction and at the same speed as said conveyor, a frusto-conical centering mechanism supported by said support means and having its axis coincident with the axis of the aperture in a first one of said pockets, carrier means on said support means and movable relative thereto for lowering said mechanism onto an apple in said first pocket to center said apple, a rod carried by said carrier means and concentric with the aperture in a second pocket, said rod being supported by said carrier means and being lowered thereby into the upper end cavity of a second apple in the second pocket to accurately locate the upper end of the stem-blossom axis of said second apple, a centering pin carried by said support means and disposed below said conveyor, and means for moving said pin through the aperture in said second pocket to engage the lower end cavity of the apple for accurately locating the lower end of the stem-blossom axis of the second apple and to support the apple above the surface of said pocket, a stemming tube slidably received around said rod and rigidly connected to said carrier means to be moved thereby through said second apple to sever the stem material therefrom, said means for moving said pin being maintained in position to support the apple while said stemming tube is being moved through a sufficient portion of said second apple to maintain alignment of said stem-blossom axis and thereafter retract said pin below said conveyor to cause the stemming tube to be moved completely through the second apple while the apple is seated in said second pocket.

3. In a machine for processing apples or the like, the combination of a conveyor, a plurality of pockets on said conveyor each having a centrally disposed aperture therein, each pocket having an apple supported on one of its ends therein, means for moving said conveyor along a predetermined path, support means disposed above said conveyor and moving in the same direction and at the same speed as the conveyor, carrier means on said support means and movable relative thereto, an apertured rod carried by said carrier means and concentric with the aperture in a pocket, said rod being supported by said carrier means and being lowered thereby into the upper end cavity of an apple in the pocket to accurately locate the upper end of the stem-blossom axis of the apple, a centering pin carried by said support means and disposed below said conveyor, means for moving said pin through the aperture in said pocket to engage the lower end cavity of the apple to accurately locate the lower end of the stem-blossom axis of the apple and to support the apple above the surface of said pocket, a stemming tube slidably received around said rod and rigidly connected to said carrier means to be moved thereby through the apple to sever the stem material therefrom, pusher means for forcing said rod through said stemming tube after said stemming tube has been moved completely through the apple to eject the stem material therefrom, and means for directing water under pressure through said rod to dislodge the stem material from the end of said apertured rod.

4. In a machine for processing apples or the like, the combination of a conveyor, a plurality of pockets on said conveyor, each pocket having a centrally disposed aperture therein, and an apple supported on one of its ends therein, means for moving said conveyor along a predetermined path, support means disposed above said conveyor and arranged to move in the same direction and at the same speed as the conveyor, carrier means on said support means and movable relative thereto, a rod carried by said carrier means and concentric with the aperture in a pocket, said rod being supported by said carrier means and being lowered thereby into the upper end cavity of an apple in the pocket to accurately locate the upper end of the stem-blossom axis of said apple, a centering pin carried by said support means and disposed below said conveyor, means for moving said pin through the aperture in said pocket to engage the lower end cavity of the apple to accurately locate the lower end of the stem-blossom axis of the apple and to support the apple above the surface of said pocket, a recentering pin carried by said support means and disposed in axial alignment with and below a downstream pocket supporting an apple with its stem material removed therefrom, and actuating means connected to said recentering pin for moving said pin through said aperture of said latter pocket and into the cavity in the apple thereon to recenter said apple.

5. In a machine for processing apples or the like, the combination of a conveyor, a pocket on said conveyor having a centrally disposed aperture therein and supporting an oriented apple on one of its ends, means for moving said conveyor along a predetermined path, a carriage arranged to move in the same direction and at the same speed as said conveyor, a vertically moving carrier on said carriage, a rod slidably supported by said carrier for vertical movement relative thereto and being disposed above said conveyor in a position concentric with said aperture, a centering pin supported by said carriage below said conveyor for movement upwardly through said aperture, and means for moving said carrier with said rod and said centering pin in timed relation for engaging the upper end cavity and lower end cavity respectively thereby accurately aligning the stem-blossom axis of the apple with the axis of said rod.

6. In a machine for processing apples or the like, the combination of means defining a pocket with an aperture therein for supporting an apple on one of its flat ends, a vertically movable carrier disposed above said pocket, a stemming tube secured to said carrier and aligned with said aperture, a stem ejector rod supported by said carrier and slidably received in said stemming tube, a centering pin supported below said pocket for movement upwardly through said aperture into engagement with the apple, means for moving said carrier downwardly to cause said rod to first engage the upper end cavity of the apple to center said cavity relative to said rod and to thereafter force said tube through the apple, and actuating means for moving said centering pin upwardly through said aperture to engage and center the lower end cavity of the apple with the axis of said rod and to support the apple while said stemming tube is being moved through a major portion of said apple, said actuating means being effective to retract said centering pin away from the apple and out of said aperture thereby permitting said stemming tube to be moved completely through the apple to sever the stem material therefrom.

7. In a machine for processing apples or the like, the combination of means defining a pocket with an aperture therein for supporting an apple on one of its flat ends, a vertically movable carrier disposed above said pocket, a stemming tube secured to said carrier and aligned with said aperture, a tubular stem ejector rod supported by said carrier and slidably received in said stemming tube, a centering pin supported below said pocket for movement upwardly through said aperture into engagement with the apple, means for moving said carrier downwardly to cause said rod to first engage the upper end cavity of the apple to center said cavity relative to said rod and to thereafter force said tube through the apple, actuating means for moving said centering pin upwardly through said aperture to engage and center the lower and cavity of the apple with said rod and to support the apple while said stemming tube is being moved through a major portion of said apple, said actuating means being effective to retract said centering pin away from the apple and out of said aperture thereby permitting said stemming tube to be moved completely through the apple to sever the stem material therefrom, means for forcing said stem ejector rod through said stemming tube to discharge the stem material therefrom after said stemming tube has been forced completely through the apple, and means for directing water under pressure through said tubular rod to dislodge the stem material from said rod.

References Cited

UNITED STATES PATENTS

| | | | |
|---|---|---|---|
| 3,163,282 | 12/1964 | Shropshire et al. | 146—51 X |
| 3,198,312 | 8/1965 | Loveland | 198—33 |
| 3,225,892 | 12/1965 | Keesling | 198—33 |
| 3,246,676 | 4/1966 | Anderson | 146—52 |

FOREIGN PATENTS 619,769  5/1961  Canada.

W. GRAYDON ABERCROMBIE, *Primary Examiner.*

UNITED STATES PATENT OFFICE
CERTIFICATE OF CORRECTION

Patent No. 3,389,730                          June 25, 1968

Gerald R. Anderson et al.

It is certified that error appears in the above identified patent and that said Letters Patent are hereby corrected as shown below:

Column 2, line 60, "control" should read -- central --.

Signed and sealed this 17th day of March 1970.

(SEAL)
Attest:

Edward M. Fletcher, Jr.
Attesting Officer

WILLIAM E. SCHUYLER, JR.
Commissioner of Patents